United States Patent
Li et al.

(10) Patent No.: US 12,032,866 B2
(45) Date of Patent: Jul. 9, 2024

(54) INPUT METHOD, ELECTRONIC DEVICE, AND SCREEN PROJECTION SYSTEM

(71) Applicant: HUAWEI TECHNOLOGIES CO., LTD., Shenzhen (CN)

(72) Inventors: Ronggen Li, Nanjing (CN); Kai Hu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/615,977

(22) PCT Filed: Jun. 18, 2020

(86) PCT No.: PCT/CN2020/096726
§ 371 (c)(1),
(2) Date: Dec. 2, 2021

(87) PCT Pub. No.: WO2020/253760
PCT Pub. Date: Dec. 24, 2020

(65) Prior Publication Data
US 2024/0094974 A1    Mar. 21, 2024

(30) Foreign Application Priority Data
Jun. 20, 2019  (CN) .......................... 201910537753.9

(51) Int. Cl.
*G06F 3/00*       (2006.01)
*G06F 3/0484*   (2022.01)
(Continued)

(52) U.S. Cl.
CPC .......... *G06F 3/1454* (2013.01); *G06F 3/0484* (2013.01); *G06F 3/0488* (2013.01)

(58) Field of Classification Search
None
See application file for complete search history.

(56) References Cited

U.S. PATENT DOCUMENTS

2010/0131688 A1   5/2010   Baek et al.
2010/0137026 A1   6/2010   Kim et al.
(Continued)

FOREIGN PATENT DOCUMENTS

CN   102033838 A   4/2011
CN   102541795 A   7/2012
(Continued)

*Primary Examiner* — Toan H Vu
(74) *Attorney, Agent, or Firm* — Rimon PC

(57) ABSTRACT

The method includes: displaying a screen projection window in at least a part of a display interface, where the screen projection window is a mirror of screen display content of a screen projection source end, and the screen display content includes a first edit box; receiving input start information from the screen projection source end, where the input start information is used to indicate that the first edit box has obtained an input focus; obtaining text content or an image that is input by an input device of the screen projection destination end, to obtain to-be-displayed content sending the to-be-displayed content to the screen projection source end; and updating the screen projection window, where an updated screen projection window is a mirror of updated screen display content of the screen projection source end, and the to-be-displayed content is displayed in the first edit box in the updated screen display content.

20 Claims, 15 Drawing Sheets

(51) Int. Cl.
*G06F 3/0488* (2022.01)
*G06F 3/14* (2006.01)
*G06F 3/01* (2006.01)

(56) References Cited

U.S. PATENT DOCUMENTS

| | | | |
|---|---|---|---|
| 2013/0124969 A1* | 5/2013 | Schochler | G06F 40/143 |
| | | | 717/136 |
| 2013/0151989 A1 | 6/2013 | Dent et al. | |
| 2014/0109024 A1* | 4/2014 | Miyazaki | H04M 1/72469 |
| | | | 715/863 |
| 2015/0020012 A1 | 1/2015 | Wang | |
| 2015/0047017 A1* | 2/2015 | Kim | H04L 63/105 |
| | | | 726/19 |
| 2015/0235346 A1* | 8/2015 | Kim | G06F 3/00 |
| | | | 345/649 |
| 2015/0373389 A1 | 12/2015 | Liao et al. | |
| 2016/0073098 A1* | 3/2016 | Villalobos Martinez | |
| | | | H04N 13/31 |
| | | | 348/54 |
| 2016/0124701 A1* | 5/2016 | Wang | G09G 5/14 |
| | | | 345/2.2 |
| 2017/0230453 A1 | 8/2017 | Verma et al. | |
| 2018/0059774 A1* | 3/2018 | Lee | G09G 5/10 |
| 2018/0219824 A1* | 8/2018 | Laller | G06F 9/451 |
| 2018/0349107 A1* | 12/2018 | Lundeen | G06F 8/38 |
| 2018/0364881 A1* | 12/2018 | Lee | G06F 3/04886 |
| 2019/0121522 A1* | 4/2019 | Davis | G06V 40/28 |
| 2020/0285438 A1* | 9/2020 | Lagnado | G09G 3/3406 |

FOREIGN PATENT DOCUMENTS

| | | |
|---|---|---|
| CN | 103593213 A | 2/2014 |
| CN | 103702436 A | 4/2014 |
| CN | 103744763 A | 4/2014 |
| CN | 105094839 A | 11/2015 |
| CN | 105677329 A | 6/2016 |
| CN | 106488016 A | 3/2017 |
| CN | 106547563 A | 3/2017 |
| CN | 106716355 A | 5/2017 |
| CN | 106886361 A | 6/2017 |
| CN | 108900697 A | 11/2018 |
| CN | 109309822 A | 2/2019 |
| CN | 110417992 A | 11/2019 |
| CN | 111629100 A | 9/2020 |
| JP | 2015162040 A | 9/2015 |
| TW | M380521 U | 5/2010 |
| WO | 2017166602 A1 | 10/2017 |
| WO | 2019114185 A1 | 6/2019 |

* cited by examiner

INPUT METHOD, ELECTRONIC DEVICE, AND SCREEN PROJECTION SYSTEM

CROSS-REFERENCE TO RELATED APPLICATIONS

This application is a National Stage of International Application No. PCT/CN2020/096726, filed on Jun. 18, 2020, which claims priority to Chinese Patent Application No. 201910537753.9, filed on Jun. 20, 2019. Both of the aforementioned applications are hereby incorporated by reference in their entireties.

TECHNICAL FIELD

This application relates to the field of data processing technologies, and specifically, to an input method, an electronic device, and a screen projection system.

BACKGROUND

A mobile phone may play a video, or may display a document, a picture, an application interface, or a web page. Because the mobile phone has a relatively small display, when content displayed by the mobile phone needs to be presented to others, the content displayed by the mobile phone may be projected onto a display device (for example, a TV, a computer, or another mobile phone) by using a screen projection technology. In a screen projection scenario, when a user wants to enter content into the mobile phone, the user may enter the content in the following two manners currently:
1. The user directly touches or clicks/taps the display of the mobile phone, to enter the content.
2. The user clicks/taps a mirror that is of a virtual keyboard of a text input method of the mobile phone and that is displayed by the display device. Then, a generated click/tap event and a click/tap location are sent to the mobile phone. The mobile phone parses the click/tap event and the click/tap location, to generate the input content.

In the prior art, in the screen projection scenario, when content is to be entered into the mobile phone, both an operation performed on the mobile phone and an operation performed on the display device need to rely on the text input method of the mobile phone. Input efficiency is relatively low in this input manner.

SUMMARY

This application provides an input method, an electronic device, and a screen projection system. Display content may be input by using an input device of a screen projection destination end, and the display content is displayed to an edit box of a screen projection source end, so that content can be rapidly and efficiently input to the screen projection source end.

A first aspect provides an input method, including: A screen projection destination end displays a screen projection window in at least a part of a display interface. The screen projection window is a mirror of screen display content of a screen projection source end, and the screen display content includes a first edit box. The screen projection destination end receives input start information from the screen projection source end. The input start information is used to indicate that the first edit box has obtained an input focus. The screen projection destination end obtains, in response to the input start information, text content or an image that is input by an input device of the screen projection destination end, to obtain to-be-displayed content. The screen projection destination end sends the to-be-displayed content to the screen projection source end. The screen projection destination end updates the screen projection window. An updated screen projection window is a mirror of updated screen display content of the screen projection source end, and the to-be-displayed content is displayed in the first edit box in the updated screen display content.

With reference to the first aspect, in a first possible implementation of the first aspect, that the screen projection destination end obtains, in response to the input start information, text content or an image that is input by an input device of the screen projection destination end includes: The screen projection destination end sets, in response to the input start information, a second edit box of the screen projection destination end to an input state. The screen projection destination end monitors to a content change event of the second edit box. The screen projection destination end obtains, in response to the content change event, text content or an image that triggers the content change event. The obtained text content or image is used as the to-be-displayed content.

In this implementation, the screen projection destination end starts the second edit box based on the input start information, and the text content or image is input to the second edit box, to obtain the to-be-displayed content. In this way, the to-be-displayed content can be flexibly and locally input to the screen projection destination end.

With reference to the first possible implementation of the first aspect, in a second possible implementation of the first aspect, the text content or image is generated by a first text input method of the screen projection destination end based on an operation command generated by the input device.

In this implementation, for to-be-displayed content, for example, a Chinese character, that needs to be input by using a text input method, the display content may be generated by a text input method of the screen projection destination end based on the operation command generated by the input device of the screen projection destination end.

With reference to the second possible implementation of the first aspect, in a third possible implementation of the first aspect, the method further includes: The screen projection destination end starts the first text input method in response to the input start information. In this implementation, the screen projection destination end can automatically start the text input method of the screen projection destination end based on the received input start information, without a need to manually start the text input method of the screen projection destination end. In this way, a user operation is reduced, and input experience of a user is improved.

With reference to the first possible implementation of the first aspect, in a fourth possible implementation of the first aspect, the second edit box is a hidden edit box or a transparent edit box; and the input start information includes a first cursor location of the first edit box, and the method further includes: The screen projection destination end sets a location of the second edit box in the screen projection window based on the first cursor location.

In this implementation, an edit box of the screen projection destination end is a hidden or transparent edit box, so that display of a mirror of the edit box of the screen projection source end on the screen projection destination end is not blocked or interfered with, thereby improving user experience. In addition, the location of the edit box of the screen projection destination end in the screen projection window is set based on a cursor location of the edit box of the screen projection source end, so that during user input, a candidate word prompt box can be displayed near the mirror of the edit box of the screen projection source end, thereby improving input experience of the user.

With reference to the fourth possible implementation of the first aspect, in a fifth possible implementation of the first aspect, after the screen projection destination end sends the to-be-displayed content to the screen projection source end, the method further includes: The screen projection destination end deletes the text content or image from the second edit box.

In this implementation, after the to-be-displayed content in the edit box of the screen projection destination end is sent to the screen projection source end, the to-be-displayed content is deleted from the edit box of the screen projection destination end, so that the screen projection destination end displays only a mirror that is of the to-be-displayed content in the edit box of the screen projection source end and that is projected from the screen projection source end. In this way, the mirror of the to-be-displayed content is not blocked or interfered with by the to-be-displayed content displayed on the screen projection destination end, thereby improving screen projection experience of the user.

With reference to the first possible implementation of the first aspect, in a sixth possible implementation of the first aspect, the second edit box is set in an interface outside the screen projection window in the display interface of the screen projection destination end.

In this implementation, the screen projection window is a partial interface in the display interface of the screen projection destination end, and a local edit box of the screen projection destination end is set in the interface outside the screen projection window in the display interface of the screen projection destination end, to prevent the local edit box of the screen projection destination end from blocking the mirror of the edit box of the screen projection source end, thereby improving screen projection experience of the user.

With reference to the first aspect, in a seventh possible implementation of the first aspect, before the screen projection destination end receives the input start information from the screen projection source end, the method further includes: The screen projection destination end obtains a click/tap signal for a mirror of the first edit box in the screen projection window. The click/tap signal includes a click/tap type and a click/tap location. The screen projection destination end sends the click/tap signal to the screen projection source end, to enable the first edit box to obtain the input focus.

In this implementation, the user may perform an operation on the screen projection destination end, to enable the edit box of the screen projection source end to obtain the input focus and enter an input state, thereby enabling the edit box of the screen projection source end to display the to-be-displayed content.

With reference to the first aspect, in an eighth possible implementation of the first aspect,
the input device is any one of the following:
a keyboard, a microphone, a camera, a scanner, a handwriting tablet, or a stylus, where
when the input device is a keyboard, the to-be-displayed content is a text generated based on an operation command corresponding to a character key of the keyboard;
when the input device is a microphone, the to-be-displayed content is a text obtained through conversion from a voice that is input by the microphone;
when the input device is a camera, the to-be-displayed content is a text or an image extracted from a picture taken by the camera;
when the input device is a scanner, the to-be-displayed content is a text or an image extracted from a picture input by the scanner; or
when the input device is a handwriting tablet or a stylus, the to-be-displayed content is a text or an image input by using the handwriting tablet or the stylus.

In this implementation, the user may enter the to-be-displayed content by using different local input devices of the screen projection destination end, and send the to-be-displayed content to the screen projection source end, to display the to-be-displayed content in the edit box of the screen projection source end.

With reference to the first aspect, in a ninth possible implementation of the first aspect, the input device is a keyboard, and the method further includes: The screen projection destination end obtains an operation command corresponding to a non-character key of the keyboard. The screen projection destination end sends the operation command to the screen projection source end, so that the screen projection source end edits content in the first edit box based on the operation command.

In this implementation, the user may operate and control the keyboard of the screen projection destination end to edit the content in the edit box of the screen projection source end, thereby improving efficiency in editing the content in the edit box of the screen projection source end.

A second aspect provides an input method, including: A screen projection source end projects screen display content of the screen projection source end onto a screen projection destination end, so that the screen projection destination end displays a screen projection window in at least a part of a display interface. The screen projection window is a mirror of the screen display content, and the screen display content includes a first edit box. The screen projection source end sends input start information to the screen projection destination end. The input start information is used to indicate that the first edit box has obtained an input focus. The screen projection source end receives to-be-displayed content from the screen projection destination end. The to-be-displayed content is obtained by the screen projection destination end in response to the input start information, and the to-be-displayed content is text content or an image that is input by an input device of the screen projection destination end. The screen projection source end displays the to-be-displayed content in the first edit box, to update the screen display content.

With reference to the second aspect, in a first possible implementation of the second aspect, the input start information is used to set a second edit box of the screen projection destination end to an input state, and the to-be-displayed content is text content or an image of a content change event that triggers the second edit box.

With reference to the first possible implementation of the second aspect, in a second possible implementation of the second aspect, the to-be-displayed content is generated by a first text input method of the screen projection destination end based on an operation command generated by the input device.

With reference to the first possible implementation of the second aspect, in a third possible implementation of the second aspect, the second edit box is a hidden edit box or a transparent edit box.

With reference to the third possible implementation of the second aspect, in a fourth possible implementation of the second aspect, the input start information includes a first cursor location of the first edit box, and the first cursor location is used to set a location of the second edit box in the screen projection window.

With reference to the fourth possible implementation of the second aspect, in a fifth possible implementation of the second aspect, before the screen projection source end sends the input start information to the screen projection destination end, the method further includes: The screen projection source end receives a click/tap signal for a mirror of the first edit box from the screen projection destination end, where the click/tap signal includes a click/tap type and a click/tap location; and starts a second text input method of the screen projection source end based on the click/tap signal, to monitor a cursor location of the first edit box by using the second text input method.

With reference to the first possible implementation of the second aspect, in a sixth possible implementation of the second aspect, the second edit box is set in an interface outside the screen projection window in the display interface of the screen projection destination end.

With reference to the second aspect, in a seventh possible implementation of the second aspect, before the screen projection source end sends the input start information to the screen projection destination end, the method further includes: The screen projection source end obtains the click/tap signal for the mirror of the first edit box from the screen projection destination end. The click/tap signal includes the click/tap type and the click/tap location. The screen projection source end enables, based on the click/tap signal, the first edit box to obtain the input focus, and sends the input start information to the screen projection destination end.

With reference to the second aspect, in an eighth possible implementation of the second aspect,
the input device is any one of the following:
a keyboard, a microphone, a camera, a scanner, a handwriting tablet, or a stylus, where
when the input device is a keyboard, the to-be-displayed content is a text generated based on an operation command corresponding to a character key of the keyboard;
when the input device is a microphone, the to-be-displayed content is a text obtained through conversion from a voice that is input by the microphone;
when the input device is a camera, the to-be-displayed content is a text or an image extracted from a picture taken by the camera;
when the input device is a scanner, the to-be-displayed content is a text or an image extracted from a picture input by the scanner; or
when the input device is a handwriting tablet or a stylus, the to-be-displayed content is a text or an image input by using the handwriting tablet or the stylus.

With reference to the second aspect, in a ninth possible implementation of the second aspect, the input device is a keyboard, and the method further includes: The screen projection source end receives, from the screen projection destination end, an operation command corresponding to a non-character key of the keyboard. The screen projection source end edits content in the first edit box based on the operation command.

A third aspect provides a screen projection destination end is provided, including a processor, a memory, a transceiver, and a display. The memory is configured to store computer executable instructions; and when the screen projection destination end runs, the processor executes the computer executable instructions stored in the memory, to enable the screen projection destination end to perform the method according to the first aspect. It should be understood that the screen projection destination end is an electronic device.

A fourth aspect provides a screen projection source end, including a processor, a memory, a transceiver, and a display. The memory is configured to store computer executable instructions; and when the screen projection source end runs, the processor executes the computer executable instructions stored in the memory, to enable the screen projection source end to perform the method according to the first aspect. It should be understood that the screen projection source end is an electronic device.

A fifth aspect provides a screen projection system, including the screen projection destination end according to the third aspect and the screen projection source end according to the fourth aspect.

According to a sixth aspect, this application provides an apparatus, including:
a display unit, configured to display a screen projection window in at least a part of a display interface, where the screen projection window is a mirror of screen display content of a screen projection source end, and the screen display content includes a first edit box;
a receiving unit, configured to receive input start information from the screen projection source end, where the input start information is used to indicate that the first edit box has obtained an input focus;
an obtaining unit, configured to obtain, in response to the input start information, text content or an image that is input by an input device of the apparatus, to obtain to-be-displayed content;
a sending unit, configured to send the to-be-displayed content to the screen projection source end; and
an updating unit, configured to update the screen projection window, where an updated screen projection window is a mirror of updated screen display content of the screen projection source end, and the to-be-displayed content is displayed in the first edit box in the updated screen display content.

With reference to the sixth aspect, in a first possible implementation of the sixth aspect, the obtaining unit includes a setting subunit, a monitoring subunit, and an obtaining subunit. The setting subunit is configured to set, in response to the input start information, a second edit box of the screen projection destination end to an input state. The monitoring subunit is configured to monitor a content change event of the second edit box. The obtaining subunit is configured to obtain, in response to the content change event, text content or an image that triggers the content change event, where the obtained text content or image is used as the to-be-displayed content.

With reference to the first possible implementation of the sixth aspect, in a second possible implementation of the sixth aspect, the text content or image is generated by a first text input method of the apparatus based on an operation command generated by the input device.

With reference to the second possible implementation of the sixth aspect, in a third possible implementation of the sixth aspect, the apparatus further includes a start unit, configured to start the first text input method in response to the input start information.

With reference to the first possible implementation of the sixth aspect, in a fourth possible implementation of the sixth aspect, the second edit box is a hidden edit box or a transparent edit box; and the input start information includes a first cursor location of the first edit box, and the setting subunit is further configured to set a location of the second edit box in the screen projection window based on the first cursor location.

With reference to the fourth possible implementation of the sixth aspect, in a fifth possible implementation of the sixth aspect, the apparatus further includes a deletion unit, configured to delete the text content or image from the second edit box after the sending unit sends the to-be-displayed content to the screen projection source end.

With reference to the first possible implementation of the sixth aspect, in a sixth possible implementation of the sixth aspect, the second edit box is set in an interface outside the screen projection window in the display interface of the screen projection destination end.

With reference to the sixth aspect, in a seventh possible implementation of the sixth aspect, the obtaining unit is further configured to obtain a click/tap signal for a mirror of the first edit box in the screen projection window before the receiving unit receives the input start information from the screen projection source end, where the click/tap signal includes a click/tap type and a click/tap location. The sending unit is further configured to send the click/tap signal to the screen projection source end, to enable the first edit box to obtain the input focus.

With reference to the sixth aspect, in an eighth possible implementation of the sixth aspect,
  the input device is any one of the following:
  a keyboard, a microphone, a camera, a scanner, a handwriting tablet, or a stylus, where
    when the input device is a keyboard, the to-be-displayed content is a text generated based on an operation command corresponding to a character key of the keyboard;
    when the input device is a microphone, the to-be-displayed content is a text obtained through conversion from a voice that is input by the microphone;
    when the input device is a camera, the to-be-displayed content is a text or an image extracted from a picture taken by the camera;
    when the input device is a scanner, the to-be-displayed content is a text or an image extracted from a picture input by the scanner; or
    when the input device is a handwriting tablet or a stylus, the to-be-displayed content is a text or an image input by using the handwriting tablet or the stylus.

With reference to the sixth aspect, in a ninth possible implementation of the sixth aspect, the input device is a keyboard, and the obtaining unit is configured to obtain an operation command corresponding to a non-character key of the keyboard. The sending unit is configured to send the operation command to the screen projection source end, so that the screen projection source end edits content in the first edit box based on operation command.

A seventh aspect provides an apparatus, including:
  a projection unit, configured to project screen display content of the apparatus onto a screen projection destination end, so that the screen projection destination end displays a screen projection window in at least a part of a display interface, where the screen projection window is a mirror of the screen display content, and the screen display content includes a first edit box;
  a sending unit, configured to send input start information to the screen projection destination end, where the input start information is used to indicate that the first edit box has obtained an input focus;
  a receiving unit, configured to receive to-be-displayed content from the screen projection destination end, where the to-be-displayed content is obtained by the screen projection destination end in response to the input start information, and the to-be-displayed content is text content or an image that is input by an input device of the screen projection destination end; and
  a display unit, configured to display the to-be-displayed content in the first edit box, to update the screen display content.

With reference to the seventh aspect, in a first possible implementation of the seventh aspect, the input start information is used to set a second edit box of the screen projection destination end to an input state, and the to-be-displayed content is text content or an image of a content change event that triggers the second edit box.

With reference to the first possible implementation of the seventh aspect, in a second possible implementation of the seventh aspect, the to-be-displayed content is generated by a first text input method of the screen projection destination end based on an operation command generated by the input device.

With reference to the first possible implementation of the seventh aspect, in a third possible implementation of the seventh aspect, the second edit box is a hidden edit box or a transparent edit box.

With reference to the third possible implementation of the seventh aspect, in a fourth possible implementation of the seventh aspect, the input start information includes a first cursor location of the first edit box, and the first cursor location is used to set a location of the second edit box in the screen projection window.

With reference to the fourth possible implementation of the seventh aspect, in a fifth possible implementation of the seventh aspect, the apparatus further includes a start unit. The receiving unit is further configured to receive a click/tap signal for a mirror of the first edit box from the screen projection destination end before the sending unit sends the input start information to the screen projection destination end, where the click/tap signal includes a click/tap type and a click/tap location. The start unit is configured to start a second text input method of the screen projection source end based on the click/tap signal, to monitor a cursor location of the first edit box by using the second text input method.

With reference to the first possible implementation of the seventh aspect, in a sixth possible implementation of the seventh aspect, the second edit box is set in an interface outside the screen projection window in the display interface of the screen projection destination end.

With reference to the seventh aspect, in a seventh possible implementation of the seventh aspect, the apparatus further includes an obtaining unit. The receiving unit is further configured to obtain the click/tap signal for the mirror of the first edit box from the screen projection destination end before the sending unit sends the input start information to the screen projection destination end, where the click/tap signal includes the click/tap type and the click/tap location. The obtaining unit is configured to enable, based on the click/tap signal, the first edit box to obtain the input focus. The sending unit is configured to send the input start information to the screen projection destination end.

With reference to the seventh aspect, in an eighth possible implementation of the seventh aspect,
  the input device is any one of the following:
  a keyboard, a microphone, a camera, a scanner, a handwriting tablet, or a stylus, where when the input device is a keyboard, the to-be-displayed content is a text generated based on an operation command corresponding to a character key of the keyboard;

when the input device is a microphone, the to-be-displayed content is a text obtained through conversion from a voice that is input by the microphone;

when the input device is a camera, the to-be-displayed content is a text or an image extracted from a picture taken by the camera;

when the input device is a scanner, the to-be-displayed content is a text or an image extracted from a picture input by the scanner; or when the input device is a handwriting tablet or a stylus, the to-be-displayed content is a text or an image input by using the handwriting tablet or the stylus.

With reference to the seventh aspect, in a ninth possible implementation of the seventh aspect, the input device is a keyboard, and the apparatus further includes an editing unit. The receiving unit is further configured to receive, from the screen projection destination end, an operation command corresponding to a non-character key of the keyboard. The editing unit is configured to edit content in the first edit box based on the operation command.

An eighth aspect provides a computer storage medium. The computer storage medium includes computer instructions, and when the computer instructions are run on a terminal, the terminal is enabled to perform the method according to the first aspect or the method according to the second aspect.

A ninth aspect provides, a computer program product. When program code included in the computer program product is executed by a processor in a terminal, the method according to the first aspect or the method according to the second aspect is performed.

According to the input method, the screen projection destination end, the screen projection source end, and the apparatus provided in the embodiments of this application, after the screen projection source end projects the screen display content of the screen projection source end onto the screen projection destination end, the user may operate and control the input device of the screen projection destination end, to generate the text content or image on the screen projection destination end; and the text content or image generated by the screen projection destination end is used as the to-be-displayed content and sent to the screen projection source end. After receiving the text content or image sent by the screen projection destination end, the screen projection source end submits the to-be-displayed content to the edit box of the screen projection source end for display, so that local input of the screen projection destination end can be synchronized to the screen projection source end without any change, thereby improving input experience of the user. For example, the screen projection destination end is a computer, and the screen projection source end is a mobile phone. According to the input method provided in the embodiments of this application, when screen display content of the mobile phone is projected onto the computer, the user may enter content into the mobile phone by using a keyboard of the computer, to break through a situation in which data and a service of the mobile phone are independent of those of the computer, so that the mobile phone and the computer can rapidly communicate with each other. In this way, the user can complete word processing of the mobile phone by using the keyboard of the computer and a text input method of the computer, to greatly improve efficiency in processing information in the mobile phone by the user in a scenario such as an office scenario.

DESCRIPTION OF EMBODIMENTS

The following describes technical solutions in embodiments of the present invention with reference to accompanying drawings. It is clear that, the described embodiments are some rather than all of the embodiments of the present invention. In the embodiments of this application, "a plurality of" includes "two", unless otherwise specified.

Figure 1:
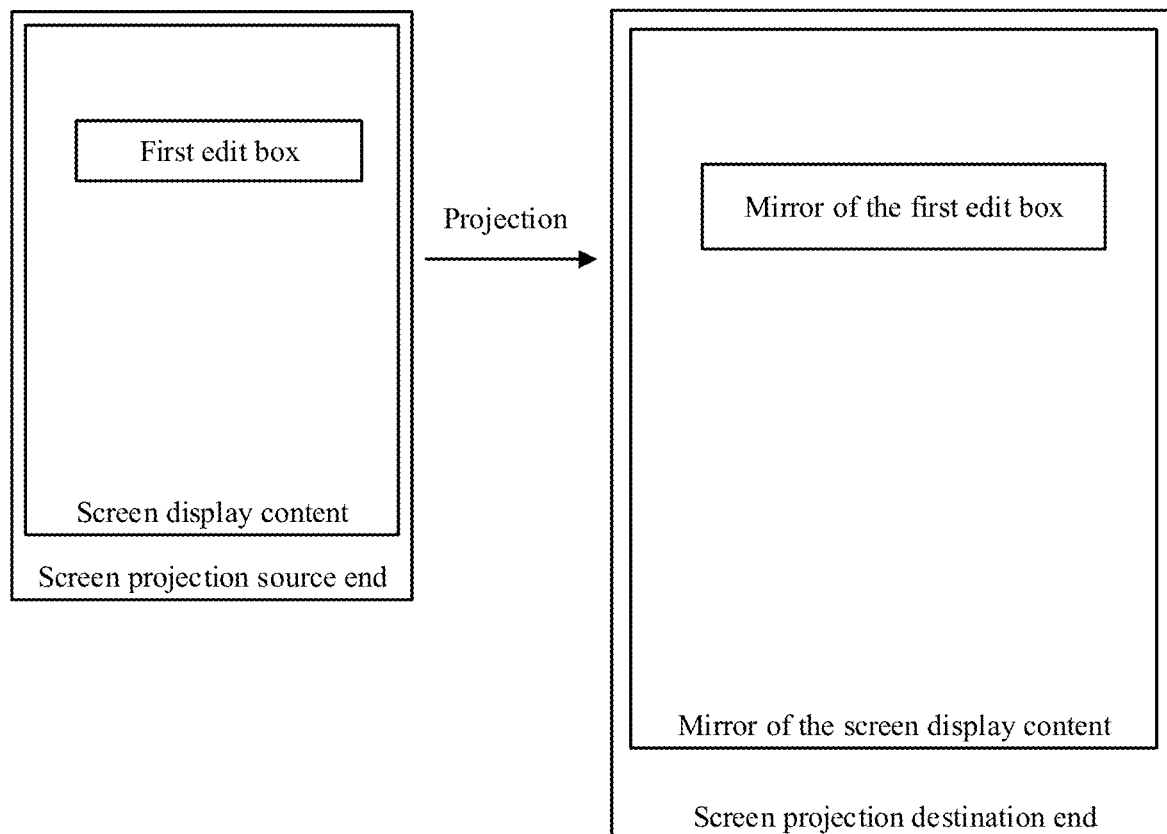
FIG. 1 is a schematic diagram of an application scenario according to an embodiment of this application.

Screen projection means that a device projects screen display content of the device onto a display or a display medium of another device, and is a relatively typical information synchronization manner between devices with a screen. In the embodiments of this application, the device that projects the screen display content of the device may be referred to as a screen projection source end, and a device that receives projection from the screen projection source end and that displays the screen display content of the screen projection source end may be referred as a screen projection destination end. Referring to FIG. 1, a screen projection source end may project screen display content of the screen projection source end onto a screen projection destination end for display. During screen projection, the screen projection source end may compress and encode video stream data of the screen display content of the screen projection source end and send the compressed video stream data to the screen projection destination end. The screen projection destination end receives and decodes the video stream data from the screen projection source end, and then displays the screen display content of the screen projection source end on a display of the screen projection destination end. For ease of description, the screen display content that is of the screen projection source end and that is displayed by the display of the screen projection destination end may be referred to as a mirror of the screen display content of the screen projection source end.

With development of an electronic device, the electronic device may provide more diversified services that may be used anytime and anywhere. To achieve better visual experience, by using a screen projection technology, a user may use the electronic device as a screen projection source end and project screen display content of the electronic device onto a display or a display medium of a screen projection destination end. The electronic device may be a mobile phone, a tablet computer, or the like. A device that can serve as the screen projection destination end includes a personal computer, a smart TV, a projector, or the like. In some scenarios, for example, in a case of a video search or document modification, the user needs to enter text content or an image to an edit box of the screen projection source end while watching screen display content that is of the screen projection source end and that is displayed by the screen projection destination end.

An embodiment of this application provides an input method. The input method may be applied to the scenario shown in FIG. 1. A user may operate and control an input device of a screen projection destination end, to generate text content or an image on the screen projection destination end, where the text content or image is used as to-be-displayed content. Then, the screen projection destination end sends the to-be-displayed content to a screen projection source end; and the screen projection source end displays, in an edit box of the screen projection source end, the to-be-displayed content received by the screen projection source end from the screen projection destination end. In this way, local input of the screen projection destination end can be synchronized to the screen projection source end without any change, thereby improving input experience of the user and improving input efficiency.

Figure 2:
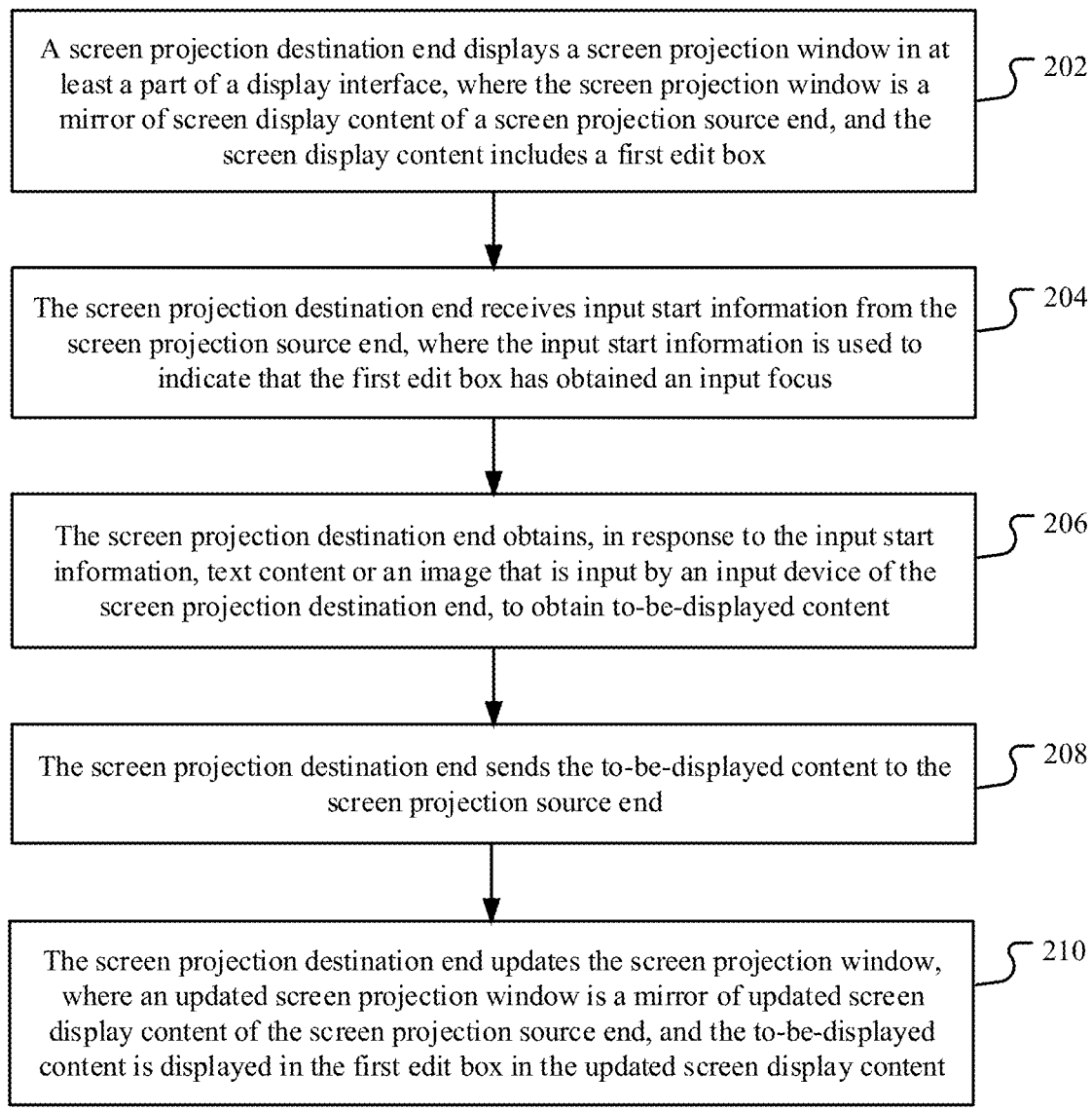
FIG. 2 is a flowchart of an input method according to an embodiment of this application.

Next, refer to FIG. 2. An input method provided in an embodiment of this application is specifically described. The method may be performed by any electronic device that has a display and a data processing capability. The electronic device that performs the input method may be referred to as a screen projection destination end. As shown in FIG. 2, the method includes the following steps: Step 202: A screen projection destination end displays a screen projection window in at least a part of a display interface, where the screen projection window is a mirror of screen display content of a screen projection source end, and the screen display content includes a first edit box. Step 204: The screen projection destination end receives input start information from the screen projection source end, where the input start information is used to indicate that the first edit box has obtained an input focus. Step 206: The screen projection destination end obtains, in response to the input start information, text content or an image that is input by an input device of the screen projection destination end, to obtain to-be-displayed content. Step 208: The screen projection destination end sends the to-be-displayed content to the screen projection source end. Step S210: The screen projection destination end updates the screen projection window, where an updated screen projection window is a mirror of updated screen display content of the screen projection source end, and the to-be-displayed content is displayed in the first edit box in the updated screen display content. It should be understood that the screen projection destination end and the screen projection source end are both electronic devices.

Next, the input method provided in this embodiment of this application is described with reference to specific examples.

First, in step 202, the screen projection destination end displays the screen projection window in the at least a part of the display interface, where the screen projection window is the mirror of the screen display content of the screen projection source end, and the screen display content includes the first edit box.

Two electronic devices, a computer and a mobile phone, are used as an example. When the computer and the mobile phone are connected by using a near field communication technology (for example, Bluetooth, Wi-Fi, peer-to-peer (P2P), or ZigBee) or a data cable (for example, a USB data cable), the mobile phone can serve as the screen projection source end and project screen display content of the mobile phone onto a display of the computer by using a screen projection technology. In this case, the computer is the screen projection destination end. Alternatively, the computer serves as the screen projection source end and may project screen display content of the computer onto a display of the mobile phone. In this case, the mobile phone is the screen projection destination end.

Specifically, projection from the mobile phone to the computer is used as an example. When the mobile phone projects the screen display content of the mobile phone onto the computer, the computer can synchronously display a mirror of the screen display content of the mobile phone. A window that is of the computer and that displays the mirror of the screen display content of the mobile phone may be referred to as a screen projection window. The computer may display the screen projection window in an entire display interface of the computer. In other words, the screen projection window occupies the entire display interface of the computer. Alternatively, the computer may display the screen projection window in a partial region of the display interface of the computer. In other words, the screen projection window is only a part of interface display content of the computer. The screen display content of the mobile phone includes a first edit box. Correspondingly, the screen projection window of the computer also displays a mirror of the first edit box.

The first edit box is a window that can serve as an input focus and that can receive, accommodate, and edit input content, and may be specifically an input box, a text box, a picture box, an address bar, a search box, an editable page (for example, a Word page), a spreadsheet (for example, an Excel spreadsheet) that can accommodate input content, or the like. It should be noted that the foregoing are merely examples for description rather than exhaustive enumeration of the first edit box.

It can be easily understood that the screen projection source end may display a plurality of windows, and the plurality of windows include at least one edit box. The first edit box is any one of the at least one edit box.

In some embodiments, the first edit box may be specifically an edit box of a first input control of the screen projection source end. For example, when the first edit box is a text box, the text box is specifically a text box of a first text box control of the screen projection source end. When the first edit box is a picture box, the picture box is specifically a picture box of a first picture box control of the screen projection source end.

Then, in step 204, the screen projection destination end receives the input start information from the screen projection source end, where the input start information is used to indicate that the first edit box has obtained the input focus.

When enabling the first edit box to obtain the input focus, the screen projection source end may send the input start information to the screen projection destination end. The input start information is used to indicate that the first edit box has obtained an input focus of the screen projection source end and can display text content or an image received by the screen projection source end.

The screen projection source end may send the input start information to the screen projection destination end through a video stream data channel. The video stream data channel is a data channel used to transmit video stream data of the screen display content when the screen projection source end projects the screen display content onto the screen projection destination end.

In some embodiments, before step 204, the input method provided in this embodiment of this application further includes: obtaining a click/tap signal for a mirror of the first edit box in the screen projection window, where the click/tap signal includes a click/tap type and a click/tap location; and sending the click/tap signal to the screen projection source end, to enable the first edit box to obtain the input focus.

In these embodiments, a user may click/tap the mirror of the first edit box in the screen projection window on the screen projection destination end, so that the screen projection destination end generates the click/tap signal. The click/tap event may include the click/tap type (for example, single-click/tap or double-click/tap) and the click/tap location (which may be specifically coordinates). The screen projection destination end may send the click/tap signal to the screen projection source end. After receiving the click/tap signal, the screen projection source end may determine, based on the click/tap location in the click/tap signal, that an operation object of the user is the first edit box. When the click/tap type in the click/tap signal is a click/tap type that enables the first edit box to obtain the input focus (for example, it may be preset that single-clicking/tapping the edit box may enable the edit box to obtain the input focus), the screen projection source end enables, based on the click/tap type, the first edit box to obtain the input focus, to enter an input state; and then sends the input start information to the screen projection destination end.

In an example of these embodiments, the screen projection destination end may send the click/tap signal to the screen projection source end through a reverse control channel. After the video stream data channel is established between the screen projection source end and the screen projection destination end, the screen projection source end and the screen projection destination end may negotiate with each other through the video stream data channel, to establish the reverse control channel. The screen projection destination end may send an operation command such as the click/tap signal to the screen projection source end through the reverse control channel.

In some embodiments, before step 204, the screen projection source end may obtain a click/tap signal for the first edit box; enable, based on the click/tap signal, the first edit box to obtain the input focus; and send the input start information to the screen projection destination end.

In these embodiments, the user may click/tap the first edit box on the screen projection source end, to enable the screen projection source end to generate the click/tap signal. The screen projection source end enables, based on the click/tap signal, the first edit box to obtain the input focus, to enter the input state; and then sends the input start information to the screen projection destination end.

In step 206, the screen projection destination end obtains, in response to the input start information, the text content or image that is input by the input device of the screen projection destination end, to obtain the to-be-displayed content.

The user may operate and control the input device of the screen projection destination end to enter the text content or image to the screen projection destination end. It can be easily understood that different electronic devices have input devices. For example, a common input device of a personal computer is a keyboard. For another example, an input device of a mobile phone is a touchscreen of the mobile phone. In addition, a microphone, a scanner, a camera, or the like may also serve as an input device of an electronic device.

An input device of an electronic device that serves as the screen projection destination end may be a built-in device or may be an externally connected device. For example, when the screen projection destination end is a notebook computer, an input device of the screen projection destination end may be a built-in keyboard, camera, microphone, or the like, or may be an externally connected keyboard, camera, microphone, or the like.

In some embodiments, the input device is a keyboard. The user may strike or press a character key of the keyboard to generate a corresponding operation command, so that the screen projection destination end can generate text content based on the operation command, to obtain the to-be-displayed content.

In some embodiments, the input device is a microphone. The user may enter a voice into a first device by using the microphone. The first device converts, into a text, the voice that is entered by the user, to obtain input content.

In some embodiments, the input device is a camera. The user may take a picture by using the camera. The screen projection destination end may extract a text from the picture taken by using the camera, to obtain input content. Specifically, text extraction may be performed by using an optical character recognition (optical character recognition, OCR) technology. The screen projection destination end may also extract an image from the picture taken by using the camera, and use the image as input content.

In some embodiments, the input device is a scanner. The user may use the scanner. The screen projection destination end may extract a text from a scanned picture that is input by using the scanner, to obtain the to-be-displayed content. Specifically, text extraction may be performed by using an OCR technology. The screen projection destination end may also extract an image from the scanned picture, to obtain the to-be-displayed content.

In some embodiments, the input device is a handwriting tablet. The text content or image sent to the screen projection source end is a text or an image that is input by using the handwriting tablet.

In some embodiments, the input device is a stylus. The text content or image sent to the screen projection source end is a text or an image that is input by using the stylus.

In some embodiments, step 206 includes: The screen projection destination end sets, in response to the input start information, a second edit box of the screen projection destination end to an input state; monitors to a content change event of the second edit box; and obtains, in response to the content change event, text content or an image that triggers the content change event, and uses the obtained text content or image as the to-be-displayed content.

The second edit box is an edit box of the screen projection destination end. When receiving the input start information, the screen projection destination end enables, in response to the input start information, the second edit box to obtain an input focus of the screen projection destination end and to enter an input state. The screen projection destination end may monitor listen to the content change event of the second edit box that is in the input state. After text content or an image is input to the second edit box, the input text content or image triggers the content change event of the second edit box. The screen projection destination end obtains, in response to the content change event, the text content or image that triggers the content change event, and uses the text content or image as the to-be-displayed content.

In some embodiments, the second edit box may be an edit box of a second input control of the screen projection destination end. For example, when the second edit box is a text box, the text box is specifically a text box of a second text box control of the screen projection destination end. When the second edit box is a picture box, the picture box is specifically a picture box of a second picture box control of the screen projection destination end.

The screen projection destination end may input, to the second edit box, a text obtained through conversion from a voice, a text or an image extracted from a picture, or a text or an image that is input by using a handwriting tablet or a stylus, and trigger the content change event.

In a first examples of these embodiments, the input content is generated by a first text input method of the screen projection destination end based on input of the input device.

The first text input method is a text input method of the screen projection destination end, and may be specifically a system built-in text input method of the screen projection destination end or may be an installed third-party text input method.

In an example, when the screen projection destination end is connected to a physical keyboard, after the second edit box enters the input state, the user may start a text input method of the screen projection destination end by using the physical keyboard of the screen projection destination end. It can be easily understood that when the input device is a physical keyboard, for an English letter and an Arabic numeral, content can be directly input to the second edit box by using the physical keyboard. In this case, the text input method is not needed. Therefore, there is no need to start a text input method. However, a character in a language other than English needs to be input by using the physical keyboard in combination with the text input method of the screen projection destination end. In this case, the user may operate the physical keyboard of the screen projection destination end (for example, press a Ctrl key and a space key at the same time) to start the text input method of the screen projection destination end. The user may strike a key of the physical keyboard to generate an operation command, to enable the first text input method to generate text content based on the operation command. When a character in a language other than English is input, the first text input method may further generate a corresponding candidate word in a candidate word prompt box based on the operation command, determine text content from the candidate word based on an operation command corresponding to a selection operation of the user, and input the text content to the second edit box, thereby triggering the content change event of the second edit box.

In an example, the screen projection destination end may start the first text input method in response to the input start information. When the screen projection destination end is connected to a physical keyboard, only a status bar of the first text input method may be displayed. The user may strike a key of the physical keyboard to generate an operation command, to enable the first text input method to generate text content based on the operation command. When a character in a language other than English is input, the first text input method may further generate a corresponding candidate word in a candidate word prompt box based on the operation command, determine text content from the candidate word based on an operation command corresponding to a selection operation of the user, and input the text content to the second edit box, thereby triggering the content change event of the second edit box.

When the screen projection destination end is a device that includes a touchscreen, a virtual keyboard of the first text input method may be displayed. The user may tap or touch a key of the virtual keyboard to generate an operation command, to enable the first text input method to generate text content based on the operation command. When a character in a language other than English is input, the first text input method may further generate a corresponding candidate word in a candidate word prompt box based on the operation command, determine text content from the candidate word based on an operation command corresponding to a selection operation of the user, and input the text content to the second edit box, thereby triggering the content change event of the second edit box.

In a second example of these embodiments, the second edit box is a hidden edit box or a transparent edit box.

The second edit box is set as a hidden edit box or a transparent edit box, so that the mirror of the screen display content of the screen projection source end is not blocked, thereby improving visual experience of the user.

In an example of this example, when the second edit box is a hidden edit box, a cursor of the second edit box is also a hidden cursor. When the second edit box is a transparent edit box, a cursor of the second edit box is also a transparent cursor. In this case, impact of the cursor of the second edit box on visual experience of the user is avoided, and the visual experience of the use is further improved.

In an example of the second example, the input start information includes a first cursor location of the first edit box. The input method provided in this embodiment of this application further includes: setting a location of the second edit box in the screen projection window based on the first cursor location.

After the first edit box obtains the input focus of the screen projection source end, the screen projection source end may obtain a cursor location of the first edit box, add the cursor location to the input start information, and send the input start information to the screen projection destination end. In an example, an input start event of the first edit box may start a text input method of the screen projection source end. The text input method of the screen projection source end may monitor the cursor location of the first edit box, add the cursor location to the input start information, and send the input start information to the screen projection destination end.

Figure 3A:
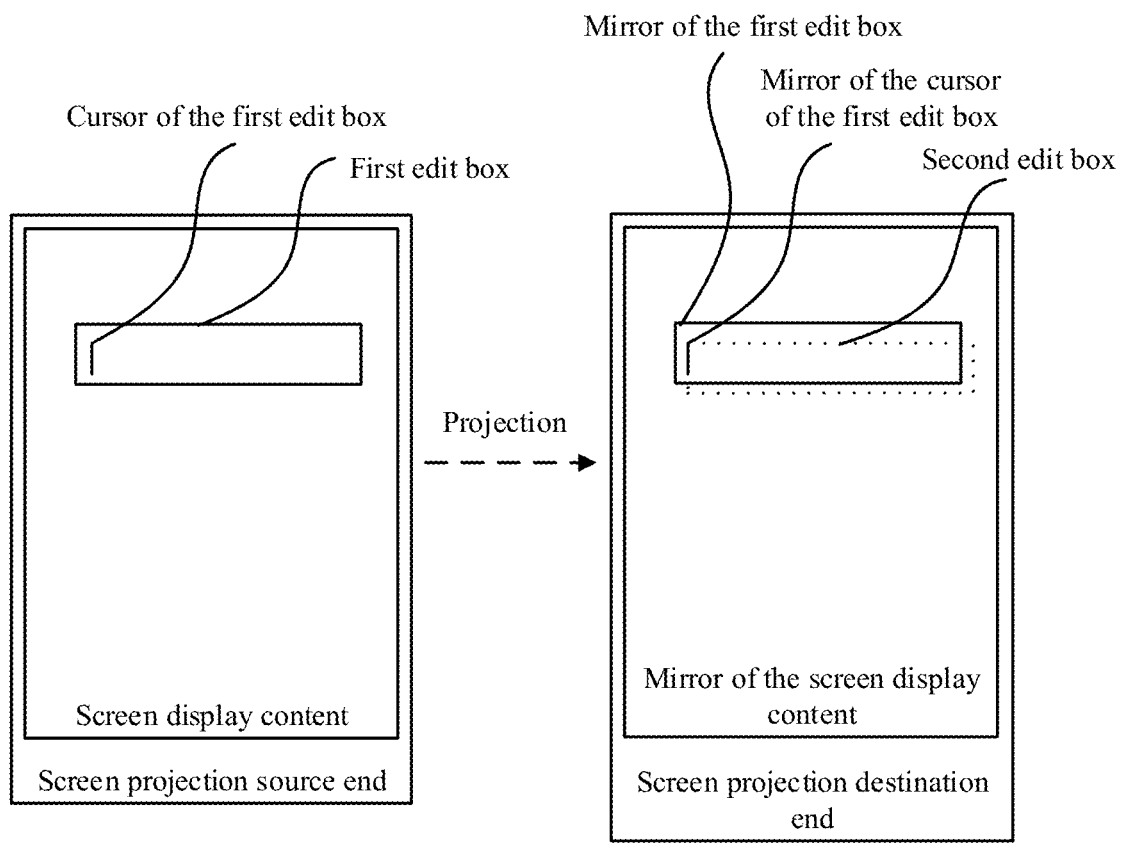
FIG. 3a is a display diagram of an interface according to an embodiment of this application.
Figure 3B:
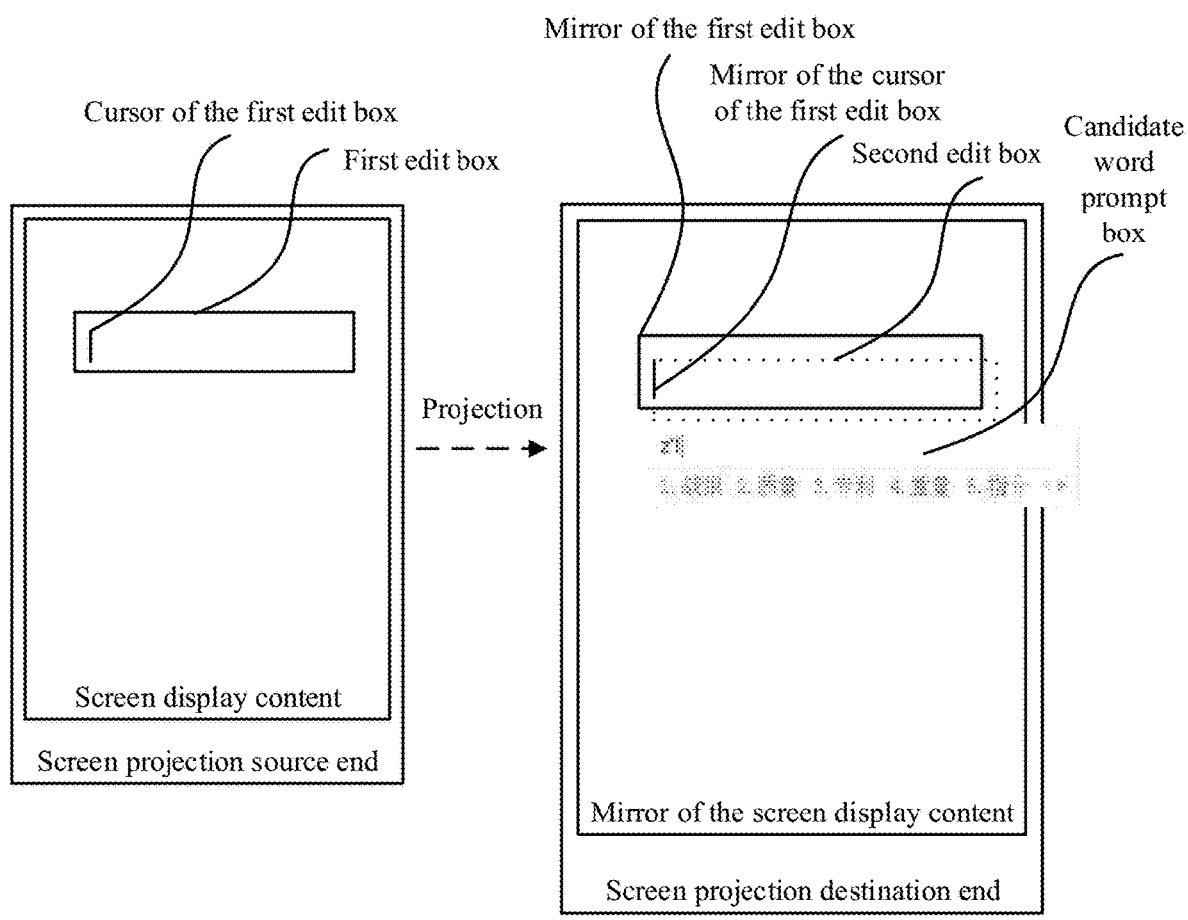
FIG. 3b is a display diagram of an interface according to an embodiment of this application.

The screen projection destination end sets the location of the second edit box based on the cursor location. The second edit box may be set near a first cursor mirror. As shown in FIG. 3a, a left border of the second edit box overlap with a mirror of a cursor of the first edit box. According to the foregoing solution, when text content is input to the second edit box, a candidate word prompt box is displayed near the first cursor mirror, to improve input experience of the user. Specifically, referring to FIG. 3b, for example, input content is Chinese characters "战狼" (meaning "war wolf" and pronounced "zhan lang"). It can be assumed that the user may sequentially strike keys "Z" and "L" on the physical keyboard. The first text input method generates a corresponding candidate word in the candidate word prompt box. The candidate word prompt box is displayed near the mirror of the cursor of the first edit box.

Figure 3C:
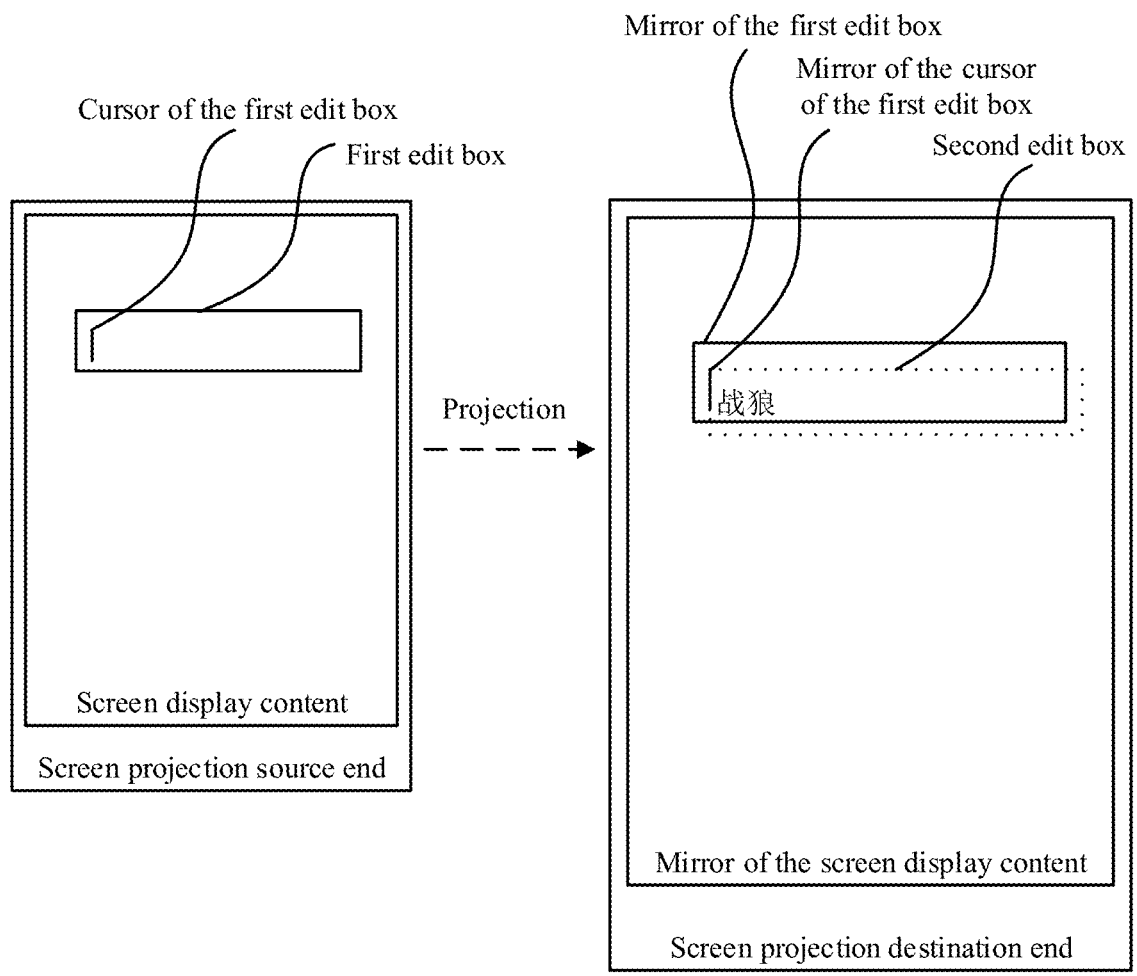
FIG. 3c is a display diagram of an interface according to an embodiment of this application.

It should be noted that each time when a content change event of the second edit box is obtained through monitoring, text content that triggers the content change event is obtained and used as text content to be sent to the screen projection source end. When the text content is an English letter or a digit, the content change event can be triggered by simply inputting a letter or a digit to the second edit box, and the letter or digit that triggers the content change event is obtained. When input content is a character in a language other than English, for example, a Chinese character, and text content is determined from a candidate word and input to the second edit box, the content change event is triggered. Specifically, referring to FIG. 3b and FIG. 3c, when the first text input method has generated the corresponding candidate word only in the candidate word prompt box, "战狼" is not input to the second edit box. Therefore, the content change event of the second edit box is not triggered. When "战狼" is input to the second edit box by striking a space key, or the like, the content change event of the second edit box is triggered, so that the screen projection destination end can obtain the input content "战狼".

In a third example of these embodiments, the second edit box is set in an interface outside the screen projection window in the display interface of the screen projection destination end.

Figure 4:
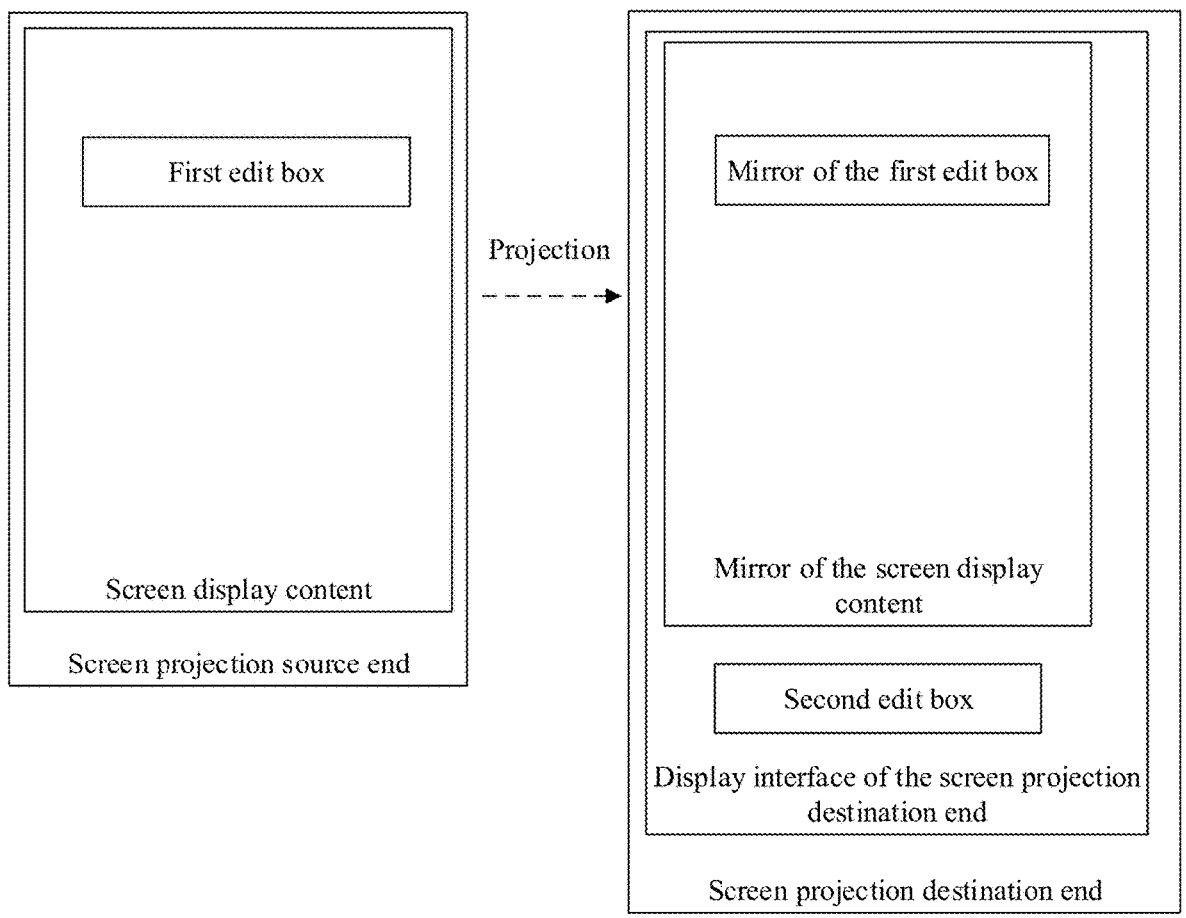
FIG. 4 is a display diagram of an interface according to an embodiment of this application.

In this example, referring to FIG. 4, the screen projection window may be a part of the display interface of the screen projection destination end. The screen projection destination end sets the second edit box in a part outside the screen projection window, so that the second edit box does not block the mirror of the screen display content of the screen projection source end, to improve visual experience of the user.

Then, in step 208, the to-be-displayed content is sent to the screen projection source end.

The screen projection destination end may send the obtained to-be-displayed content to the screen projection source end, and may specifically transmit the to-be-displayed content through the video stream data channel. After receiving the to-be-displayed content, the screen projection source end submits the to-be-displayed content to the first edit box, so that the to-be-displayed content can be displayed in the first edit box, thereby updating the screen display content of the screen projection source end.

Then, in step 210, the screen projection destination end updates the screen projection window, where the updated screen projection window is the mirror of the updated screen display content of the screen projection source end, and the to-be-displayed content is displayed in the first edit box in the updated screen display content.

It can be easily understood that, in a scenario in which the screen projection source end projects the screen display content of the screen projection source end onto the screen projection destination end, the screen projection window of the screen projection destination end is the mirror of the screen display content of the screen projection source end. When the screen display content of the screen projection source end is updated, the screen projection window is also updated correspondingly. The updated screen projection window is the mirror of the updated screen display content. The to-be-displayed content is displayed in the first edit box in the updated screen display content. Correspondingly, a mirror of the to-be-displayed content is also displayed in a mirror that is of the first edit box and that is in the updated screen projection window.

More specifically, in an example, the screen projection source end transmits data of the screen display content of the screen projection source end to the screen projection destination end in real time through the video stream data channel. The screen projection destination end displays the mirror of the screen display content of the screen projection source end based on the data that is of the screen display content of the screen projection source end and that is received by the screen projection destination end. Therefore, the screen projection source end may send, to the screen projection destination end, the data of the corresponding screen display content in which the first edit box displays the to-be-displayed content. The mirror that is of the screen display content of the screen projection source end and that is displayed by the screen projection destination end based on the data includes the mirror of the to-be-displayed content, and the mirror of the to-be-displayed content is located in the mirror of the first edit box.

Figure 3D:
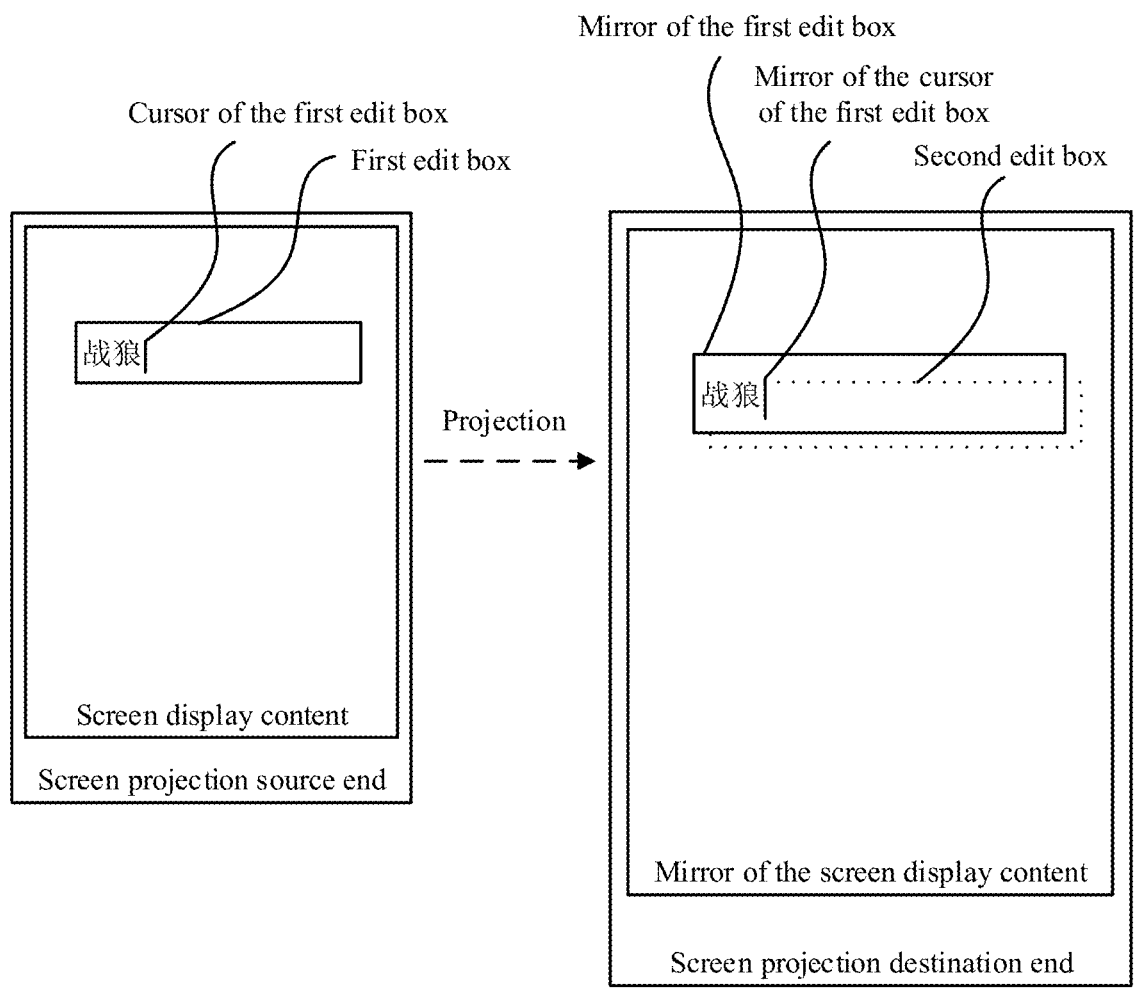
FIG. 3d is a display diagram of an interface according to an embodiment of this application.

In some embodiments, after step 208, the input method provided in this application further includes: deleting the text content or image from the second edit box. Referring to FIG. 3d, for example, the to-be-displayed content is "战狼". After "战狼" is used as the to-be-displayed content and sent to the screen projection source end, the screen projection destination end deletes "战狼" from the second edit box, so that a mirror of "战狼" in the mirror of the first edit box is not blocked by "战狼" in the second edit box.

In some embodiments, the screen projection source end may monitor a cursor location of a first input box. In an example, specifically, a text input method of the screen projection source end may monitor the cursor location of the first input box. Input of the screen projection source end may be started by an input event of the first edit box. It can be easily understood that after content is input to the first edit box, a change in the cursor location of the first edit box is caused. The screen projection source end may monitor the change in the cursor location of the first edit box and send a changed cursor location of the first edit box to the screen projection destination end. Specifically, the screen projection source end may transmit the changed cursor location of the first edit box through the video stream data channel. After receiving the changed cursor location of the first edit box, the screen projection destination end may reset a location of the second edit box based on the changed cursor location of the first edit box. In this way, during input of the input device of the screen projection destination end, the candidate word prompt box of the text input method of the screen projection destination end may be displayed near the mirror of the first edit box, to improve input experience of the user.

In some embodiments, when the input device of the screen projection destination end is a keyboard, the input method provided in this embodiment of this application further includes: The screen projection destination end obtains an operation command corresponding to a non-character key of the keyboard, and sends the operation command corresponding to the non-character key to the screen projection source end. Specifically, the screen projection destination end may transmit, through the reverse control channel, the operation command corresponding to the non-character key.

After receiving the operation command, the screen projection source end controls the screen display content of the screen projection source end based on the operation command. In an example, when the operation command is an operation command for editing text content or an image, the screen projection source end edits the text content or image displayed in the first edit box based on the operation command.

It should be noted that, in this embodiment of this application, keys of the keyboard may be categorized into character keys and non-character keys. When the user strikes or presses a character key, an operation command corresponding to the character key is generated. A device may generate text content based on the operation command corresponding to the character key. Character keys may specifically include digit keys 9 (0 to 9), letter keys (a to z), punctuation keys (for example, ",", ".", "!", and "?"), and special character keys (for example, #, ¥, %,*, and \).

The non-character keys are keys other than character keys of the keyboard, and are specifically non-character keys such as control (Ctrl), shift (Shift), alternate (Alt), caps lock (Caps Lock), insert (Insert), home (Home), end (End), delete (Del), page up (PgUp), page down (PgDn), enter (Enter), backspace (BackSpace), and arrow keys of the keyboard. The user may perform an operation of striking or pressing a non-character key of the keyboard, to generate a corresponding operation command. The operation command may be sent to the screen projection source end through the reverse control channel, so that the screen projection source end performs an action such as cursor movement, letter case switching, insertion, deletion, line breaking, or sending, in the first edit box based on the operation command.

In some embodiments, the user may click/tap an interface outside the first edit box in the screen projection window of the screen projection destination end, to generate a click/tap signal. The click/tap signal includes a click/tap type (which may be specifically single-click/tap) and a click/tap location (which may be specifically coordinates). The screen projection destination end may send the click/tap signal to the screen projection source end. Specifically, the screen projection destination end may transmit the click/tap signal through the reverse control channel. The screen projection source end parses the click/tap location and the click/tap type, to enable the first edit box to lose the input focus and to exit the input state.

In an example of these embodiments, when the first edit box loses the focus and exits the input state, the screen projection source end may send input exit information to the screen projection destination end. Specifically, the screen projection source end may transmit the changed cursor location of the first edit box through the video stream data channel. After receiving the input exit information, the screen projection destination end enables, in response to the input exit information, the second edit box to lose the input focus and exit the input state.

In this embodiment of this application, after the screen projection source end projects the screen display content of the screen projection source end onto the screen projection destination end, the user may operate and control the input device of the screen projection destination end, to generate the text content or image on the screen projection destination end; and the text content or image generated by the screen projection destination end is used as the to-be-displayed content and sent to the screen projection source end. After receiving the text content or image sent by the screen projection destination end, the screen projection source end submits the to-be-displayed content to the edit box of the screen projection source end for display, so that local input of the screen projection destination end can be synchronized to the screen projection source end without any change, thereby improving input experience of the user. For example, the screen projection destination end is a computer, and the screen projection source end is a mobile phone. According to the input method provided in this embodiment of this application, when screen display content of the mobile phone is projected onto the computer, the user may enter content into the mobile phone by using a keyboard of the computer, to break through a situation in which data and a service of the mobile phone are independent of those of the computer, so that the mobile phone and the computer can rapidly communicate with each other. In this way, the user can complete word processing of the mobile phone by using the keyboard of the computer and a text input method of the computer, to greatly improve efficiency in processing information in the mobile phone by the user in a scenario such as an office scenario.

Next, in an embodiment, a cross-device input method provided in the embodiments of this application is described by using an example.

Figure 5:
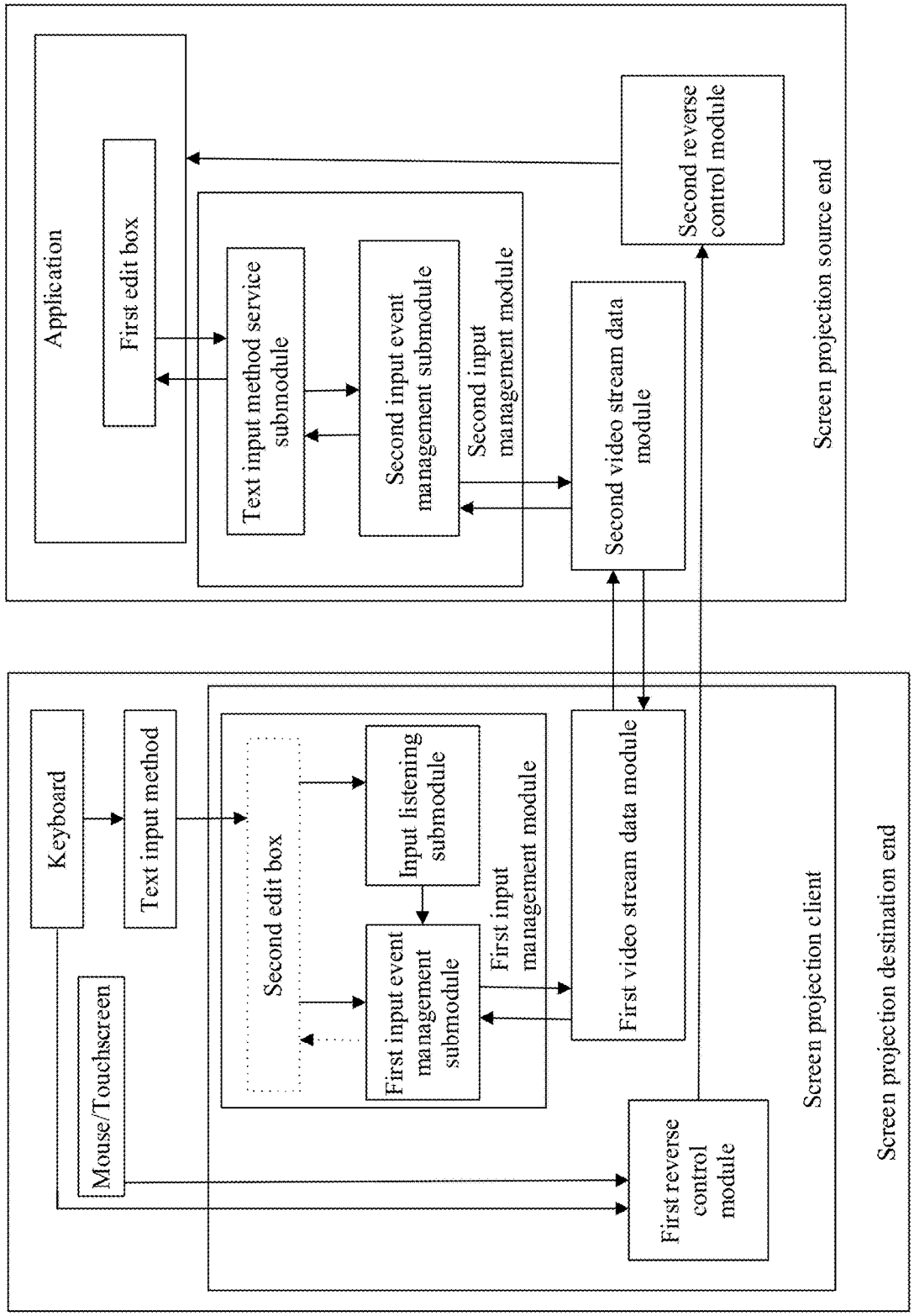
FIG. 5 is a schematic diagram of an application architecture of an input method according to an embodiment of this application.

The input method provided in this embodiment is applied to an architecture shown in FIG. 5. The architecture includes a screen projection destination end and a screen projection source end. The screen projection destination end and the screen projection source end may be connected by using a near field communication technology or connected by using a data cable. An input device of the screen projection destination end may include a keyboard, and may further include a mouse or a touchscreen. A text input method and a screen projection client are installed on the screen projection destination end. The text input method of the screen projection destination end may generate text content or an image based on an operation command generated by the keyboard or the touchscreen, and the text content or image is used as to-be-displayed content. By using the screen projection client, the screen projection destination end may receive video stream data of screen display content of the screen projection source end and display a mirror of the screen display content of the screen projection source end. Specifically, the screen projection client may include a first input management module, a first video stream data module, and a first reverse control module. The first input management module includes a second edit box, and the second edit box may be a text box. The text box is a hidden text box, and borders of the text box are not displayed on a screen of the screen projection destination end. The first input management module further includes an input monitoring submodule and a first input event management submodule.

It should be noted that, that the first input management module, the first video stream data module, and the first reverse control module are integrated into the screen projection client is used as an example above, and descriptions of these modules do not limit an existence form of these modules.

The screen projection source end is a source end of screen projection, and an application is installed on the screen projection source end. The application includes a first edit box, and the first edit box may be a text box. The first edit box is displayed on a screen of the screen projection source end. Correspondingly, a mirror of the first edit box is displayed on the screen of the screen projection destination end. The screen projection source end includes a second input management module, a second video stream data module, and a second reverse control module. The second input management module further includes a text input method service submodule and a second input event management submodule. The text input method service submodule may be a module of a text input method installed on the screen projection source end, or may be a module of a text input method that is built in a system of the screen projection source end.

The first video stream data module and the second video stream data module communicate with each other through a video stream data channel. The first reverse control module and the second reverse control module communicate with each other through a reverse control channel.

When using a screen projection service by using the screen projection destination end and the screen projection source end, a user may click the mirror of the first edit box on the screen of the screen projection destination end by using the mouse or click/tap the mirror by using the touchscreen, to generate a first click/tap signal. The first click/tap signal includes a click/tap type and click/tap coordinates. The screen projection destination end sends the first click/tap signal to the screen projection source end through the reverse control channel by using the first reverse control module.

After receiving the first click/tap signal by using the second reverse control module, the screen projection source end dispatches the first click/tap signal to the application. The application parses the first click/tap signal, to enable the first edit box to obtain an input focus and request the text input method submodule service to start the text input method. The text input method service submodule enables, in response to the request to start the text input method, monitoring to a cursor location of the first edit box. The second input event management submodule uses input start information to carry the cursor location of the first edit box and sends the input start information to the screen projection destination end through the reverse control channel by using the second reverse control module. The input start information is used to indicate that the first edit box has obtained the input focus.

After the screen projection destination end receives, by using the first reverse control module, the input start information that includes the cursor location of the first edit box, the first input event management submodule sets, in response to an input start event, the second edit box to an input state; starts the text input method of the screen projection destination end; and sets a location of the second edit box based on the cursor location of the first edit box. Specifically, a left border of the second edit box may be overlapped with a location of a cursor mirror of the first edit box.

For example, a Chinese character is input. The user strikes the keyboard of the screen projection destination end, to generate an operation command. The text input method of the screen projection destination end displays, based on the operation command, a candidate word prompt box on the left side of the second edit box, in other words, near the cursor mirror of the first edit box. The user may strike a space key of the keyboard, to determine a candidate word in the candidate word prompt box as input text content and input the text content to the second edit box. When the text content is input to the second edit box, a content change event of the second edit box is triggered. When obtaining the content change event through monitoring, the input monitoring submodule notifies the first input management submodule to extract the text content from the second edit box. The text content is used as to-be-displayed content and sent to the screen projection source end by using the first video stream data module. In addition, the text content is also deleted from the second edit box.

The screen projection source end receives the to-be-displayed content by using the second video stream data module. The second input event management submodule submits, by using the text input method service submodule, the to-be-displayed content to the first edit box for display. Correspondingly, the screen of the screen projection destination end displays a mirror of the to-be-displayed content. After the to-be-displayed content is submitted to the first edit box, a change in the cursor location of the first edit box is caused. The text input method service submodule obtains the change in the cursor location of the first edit box through monitoring, and sends a changed cursor location to the screen projection destination end by using the second video stream data module.

After the first video stream data module receives the changed cursor location, the first input management module updates the location of the second edit box based on the changed cursor location.

When the user strikes a non-character key of the keyboard of the screen projection destination end, an operation command corresponding to the non-character key is generated. The screen projection destination end sends the operation command to the screen projection source end by using the first reverse control module. The second reverse control module of the screen projection source end receives the operation command and dispatches the operation command to the application, to enable the application to perform a related operation based on the operation command. For example, when the user strikes a deletion key of the keyboard of the screen projection destination end, the application may perform a deletion operation on the text content in the first edit box based on the deletion key.

When the user clicks/taps a location outside the mirror of the first edit box by using the mouse or the touchscreen, a second click/tap signal is generated. The second click/tap signal includes a click/tap type and a click/tap location. The screen projection destination end sends the second click/tap signal to the screen projection source end by using the first reverse control module. The second reverse control module receives the second click/tap signal, and dispatches the second click/tap signal to the application, so that the application enables the first edit box to lose the input focus and to exit the input state.

That the first edit box loses the input focus triggers input end information. The input end information is used to request the text input method submodule service to disable the text input method. The text input method service submodule sends, in response to the request to disable the text input method, the input end information to the screen projection destination end by using the second video stream data module.

The first video stream data module receives the input end information. In response to the input end information, the first input event management submodule enables the second edit box to lose a focus and to exit an input state, and disables the text input method.

In this embodiment of this application, after the screen projection source end projects the screen display content of the screen projection source end onto the screen projection destination end, the user may operate and control the input device of the screen projection destination end, to generate the text content or image on the screen projection destination end; and the text content or image generated by the screen projection destination end is used as the to-be-displayed content and sent to the screen projection source end. After receiving the to-be-displayed content sent by the screen projection destination end, the screen projection source end submits the to-be-displayed content to the edit box of the screen projection source end for display, so that local input of the screen projection destination end can be synchronized to the screen projection source end without any change, thereby improving input experience of the user. For example, the screen projection destination end is a computer, and the screen projection source end is a mobile phone. According to the input method provided in this embodiment of this application, when screen display content of the mobile phone is projected onto the computer, the user may enter content into the mobile phone by using a keyboard of the computer, to break through a situation in which data and a service of the mobile phone are independent of those of the computer, so that the mobile phone and the computer can rapidly communicate with each other. In this way, the user can complete word processing of the mobile phone by using the keyboard of the computer and a text input method of the computer, to greatly improve efficiency in processing information in the mobile phone by the user in a scenario such as an office scenario.

Figure 6:
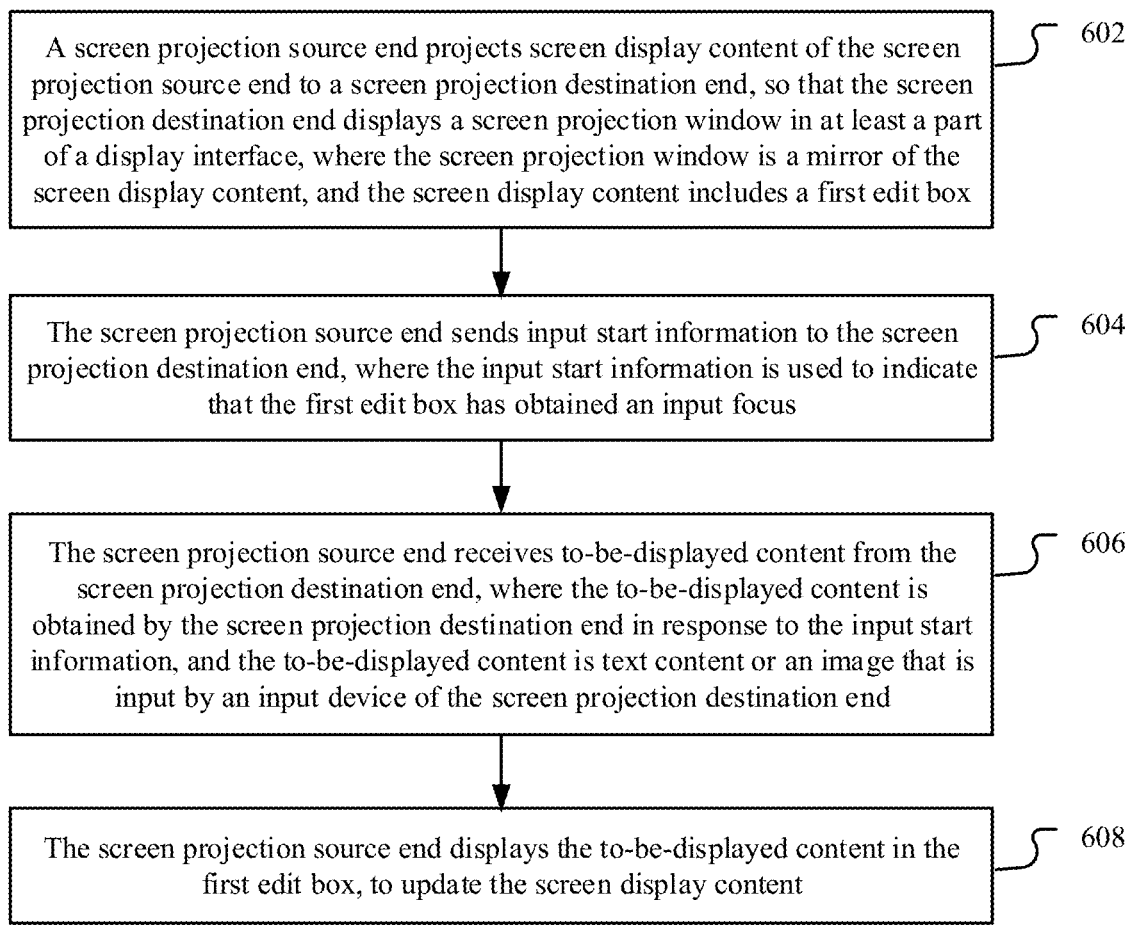
FIG. 6 is a flowchart of an input method according to an embodiment of this application.

An embodiment of this application provides an input method. The method is performed by a screen projection source end. Refer to FIG. 6. The method includes the following steps: Step 602: The screen projection source end projects screen display content of the screen projection source end onto a screen projection destination end, so that the screen projection destination end displays a screen projection window in at least a part of a display interface, where the screen projection window is a mirror of the screen display content, and the screen display content includes a first edit box. Step 604: The screen projection source end sends input start information to the screen projection destination end, where the input start information is used to indicate that the first edit box has obtained an input focus. Step 606: The screen projection source end receives to-be-displayed content from the screen projection destination end, where the to-be-displayed content is obtained by the screen projection destination end in response to the input start information, and the to-be-displayed content is text content or an image that is input by an input device of the screen projection destination end. Step 608: The screen projection source end displays the to-be-displayed content in the first edit box, to update the screen display content.

In some embodiments, the input start information is used to set a second edit box of the screen projection destination end to an input state, and the to-be-displayed content is text content or an image of a content change event that triggers the second edit box.

In an example of these embodiments, the to-be-displayed content is generated by a first text input method of the screen projection destination end based on an operation command generated by the input device.

In an example of these embodiments, the second edit box is a hidden edit box or a transparent edit box.

In an example of this example, the input start information includes a first cursor location of the first edit box, and the first cursor location is used to set a location of the second edit box in the screen projection window.

In a specific possible implementation of this example, before the screen projection source end sends the input start information to the screen projection destination end, the method further includes: The screen projection source end receives a click/tap signal for a mirror of the first edit box from the screen projection destination end, where the click/tap signal includes a click/tap type and a click/tap location; and starts a second text input method of the screen projection source end based on the click/tap signal, to monitor a cursor location of the first edit box by using the second text input method.

In an example of these embodiments, the second edit box is set in an interface outside the screen projection window in the display interface of the screen projection destination end.

In some embodiments, before the screen projection source end sends the input start information to the screen projection destination end, the method further includes: The screen projection source end obtains the click/tap signal for the mirror of the first edit box from the screen projection destination end, where the click/tap signal includes the click/tap type and the click/tap location. The screen projection source end enables, based on the click/tap signal, the first edit box to obtain the input focus, and sends the input start information to the screen projection destination end.

In some embodiments, the input device is any one of the following:
  a keyboard, a microphone, a camera, a scanner, a handwriting tablet, or a stylus, where
  when the input device is a keyboard, the to-be-displayed content is a text generated based on an operation command corresponding to a character key of the keyboard;
  when the input device is a microphone, the to-be-displayed content is a text obtained through conversion from a voice that is input by the microphone;
  when the input device is a camera, the to-be-displayed content is a text or an image extracted from a picture taken by the camera;
  when the input device is a scanner, the to-be-displayed content is a text or an image extracted from a picture input by the scanner; or
  when the input device is a handwriting tablet or a stylus, the to-be-displayed content is a text or an image input by using the handwriting tablet or the stylus.

In some embodiments, the input device is a keyboard, and the method further includes:
  the screen projection source end receives, from the screen projection destination end, an operation command corresponding to a non-character key of the keyboard; and
  the screen projection source end edits content in the first edit box based on the operation command.

For details about the steps shown in FIG. 6, refer to implementations of the method embodiment shown in FIG. 2. Details are not described herein again.

In this embodiment of this application, after the screen projection source end projects the screen display content of the screen projection source end onto the screen projection destination end, a user may operate and control the input device of the screen projection destination end, to generate the text content or image on the screen projection destination end; and the text content or image generated by the screen projection destination end is used as the to-be-displayed content and sent to the screen projection source end. After receiving the text content or image sent by the screen projection destination end, the screen projection source end submits the to-be-displayed content to the edit box of the screen projection source end for display, so that local input of the screen projection destination end can be synchronized to the screen projection source end without any change, thereby improving input experience of the user. For example, the screen projection destination end is a computer, and the screen projection source end is a mobile phone. According to the input method provided in this embodiment of this application, when screen display content of the mobile phone is projected onto the computer, the user may enter content into the mobile phone by using a keyboard of the computer, to break through a situation in which data and a service of the mobile phone are independent of those of the computer, so that the mobile phone and the computer can rapidly communicate with each other. In this way, the user can complete word processing of the mobile phone by using the keyboard of the computer and a text input method of the computer, to greatly improve efficiency in processing information in the mobile phone by the user in a scenario such as an office scenario.

Figure 7:
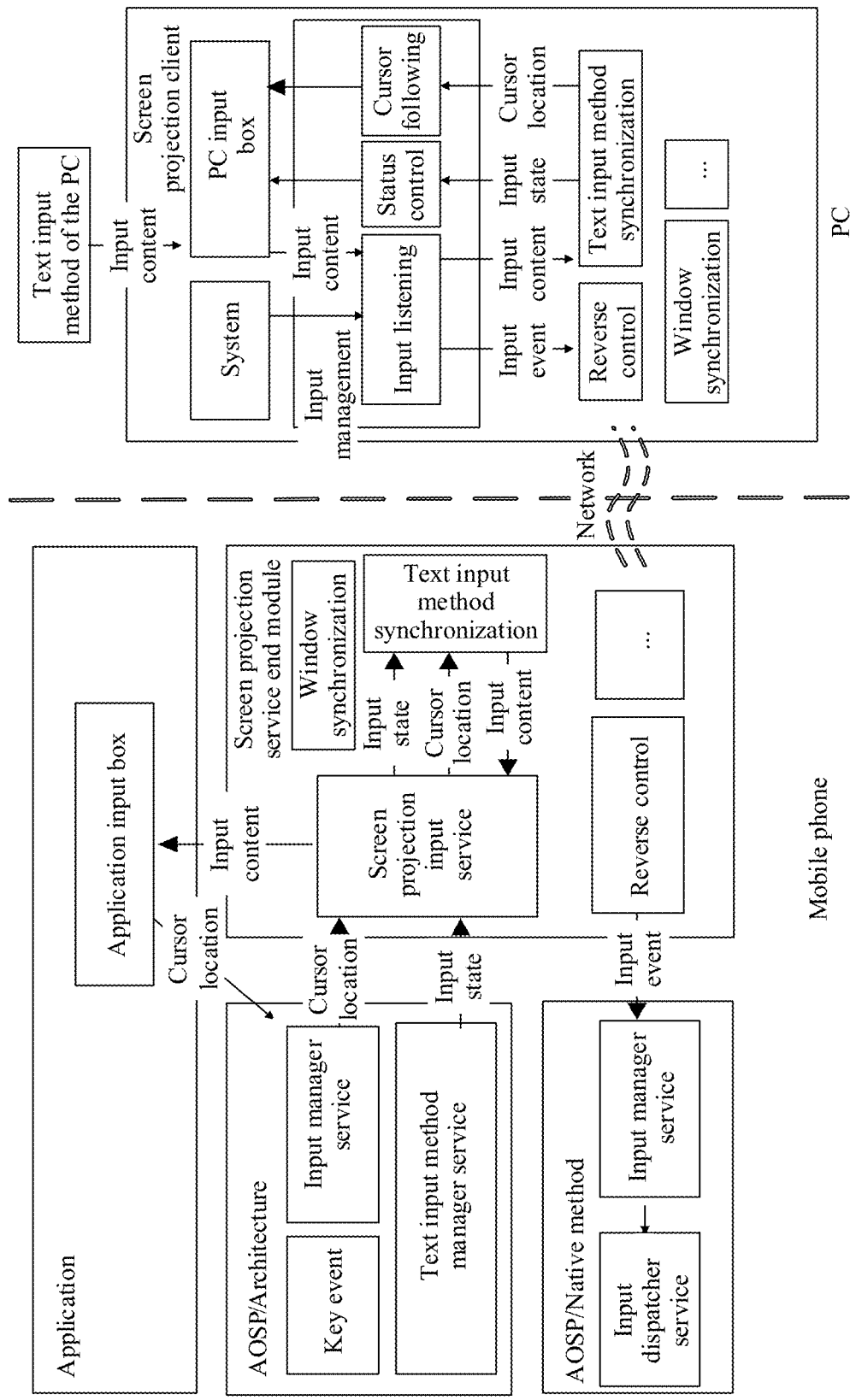
FIG. 7 is a schematic diagram of an application architecture of an input method according to an embodiment of this application.

In an embodiment, an application architecture to which the input method provided in the embodiments of this application may be applied is provided. Refer to FIG. 7. The application architecture includes a mobile phone and a personal computer (PC). The mobile phone and the PC are connected over a network. The mobile phone includes a screen projection service end module, an application, an android open source project (AOSP) architecture, and an AOSP native method module. The screen projection service end module includes a screen projection input service module, a text input method synchronization module, and a reverse control module. An application input box is included. The AOSP architecture includes a key event module (key event), an input manager service module (input manager service), a text input method manager service module (input method manager service). The AOSP native method module includes an input dispatcher service module (input dispatcher) and an input manager service module (input manager service).

As a screen projection client, the PC includes a PC text input method module, a system, a PC input box, an input management module, a reverse control module, a text input method synchronization module, and a window synchronization module. The input management module of the PC includes an input monitoring listening module, a status control module, and a cursor following module.

The mobile phone may project screen display content of the mobile phone onto a screen of the PC, and perform window synchronization, to be specific, synchronize display content. After the application input box obtains an input focus and enters an input state, the input manager service module of the AOSP architecture may obtain a cursor location of the application input box and sends the cursor location to the screen projection input service module of the mobile phone. The text input method manager service module of the AOSP architecture may obtain the input state of the application input box, and send the input state to the screen projection input service module of the mobile phone. The screen projection input service module of the mobile phone may send the input state and the cursor location of the application input box to the text input method synchronization module of the mobile phone. The text input method synchronization module of the mobile phone may send the input state and the cursor location of the application input box to the text input method synchronization module of the PC.

The text input method synchronization module of the PC may send the input state of the application input box to the status control module of the PC. The status control module sets an input state of a PC input box based on the input state of the application input box. The text input method synchronization module of the PC may send the cursor location of the application input box to the cursor following module of the PC. The cursor following module sets a location of the PC input box based on the cursor location.

After the PC input box enters the input state, a user may enter input content into the PC input box by using input of the PC. The PC input box sends the input content to the input monitoring module of the PC. The input monitoring module of the PC may send the input content to the text input method synchronization module of the mobile phone by using the text input method synchronization module of the PC. The text input method synchronization module of the mobile phone sends the input content to the screen projection input service module of the mobile phone. The screen projection input service module of the mobile phone submits the input content to the application input box for display.

The input monitoring module of the PC may further monitor to an input event of the system, and send the input event to the mobile phone by using the reverse control module. The AOSP native method module obtains the input event from the reverse control module of the mobile phone and sends the input event to the input dispatcher service module. The input dispatcher service module may dispatch the input event to the application, so that the application may manage content in the application input box based on the input event.

Figure 8:
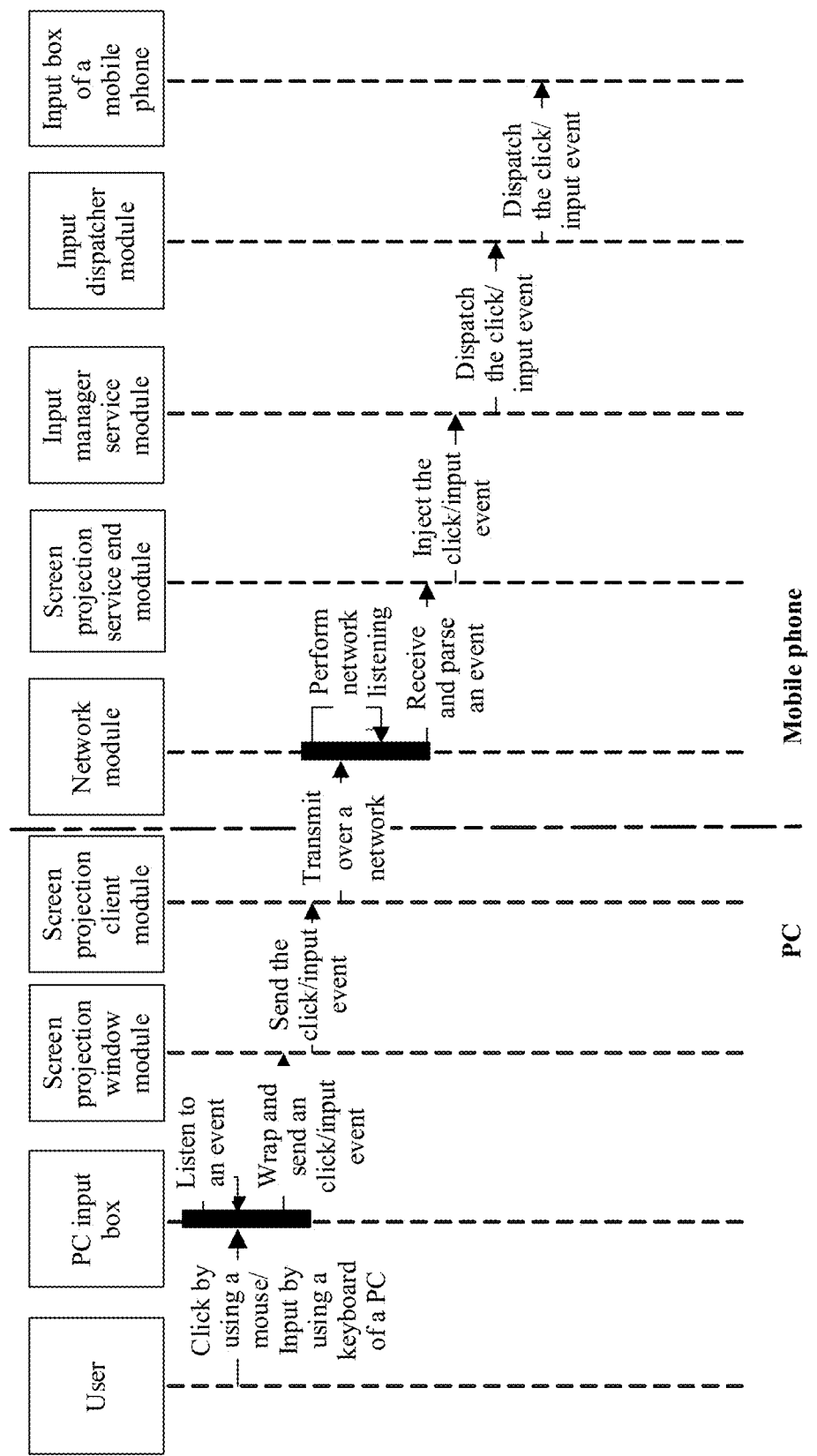
FIG. 8 is a flowchart of an input method according to an embodiment of this application.

In an embodiment, an input method is provided. Referring to FIG. 8, the method includes the following content.

When a mobile phone projects screen display content of the mobile phone onto a computer (PC), so that the PC displays the screen display content of the mobile phone, a user may operate a mouse of the PC, to enter a mouse click event into a PC input box; or a user may operate a keyboard of the PC, to enter a PC keyboard input event into the PC input box. The PC input box monitors to an event, and wraps and sends a click/input event. A screen projection window module sends, to a screen projection client module, the click/input event received by the screen projection window module from the PC input box. The screen projection client module sends the click/input event to a network module of the mobile phone over a network. The network module performs network monitoring, receives and parses the event, and then sends the parsed click/input event to a screen projection service end module. The screen projection service end module injects the click/input event to an input manager service module (input manager service). The input manager service module may dispatch the click/input event to an input dispatcher module (input dispatcher). The input dispatcher module dispatches the click/input event to an input box (edittext) of the mobile phone.

Figure 9:
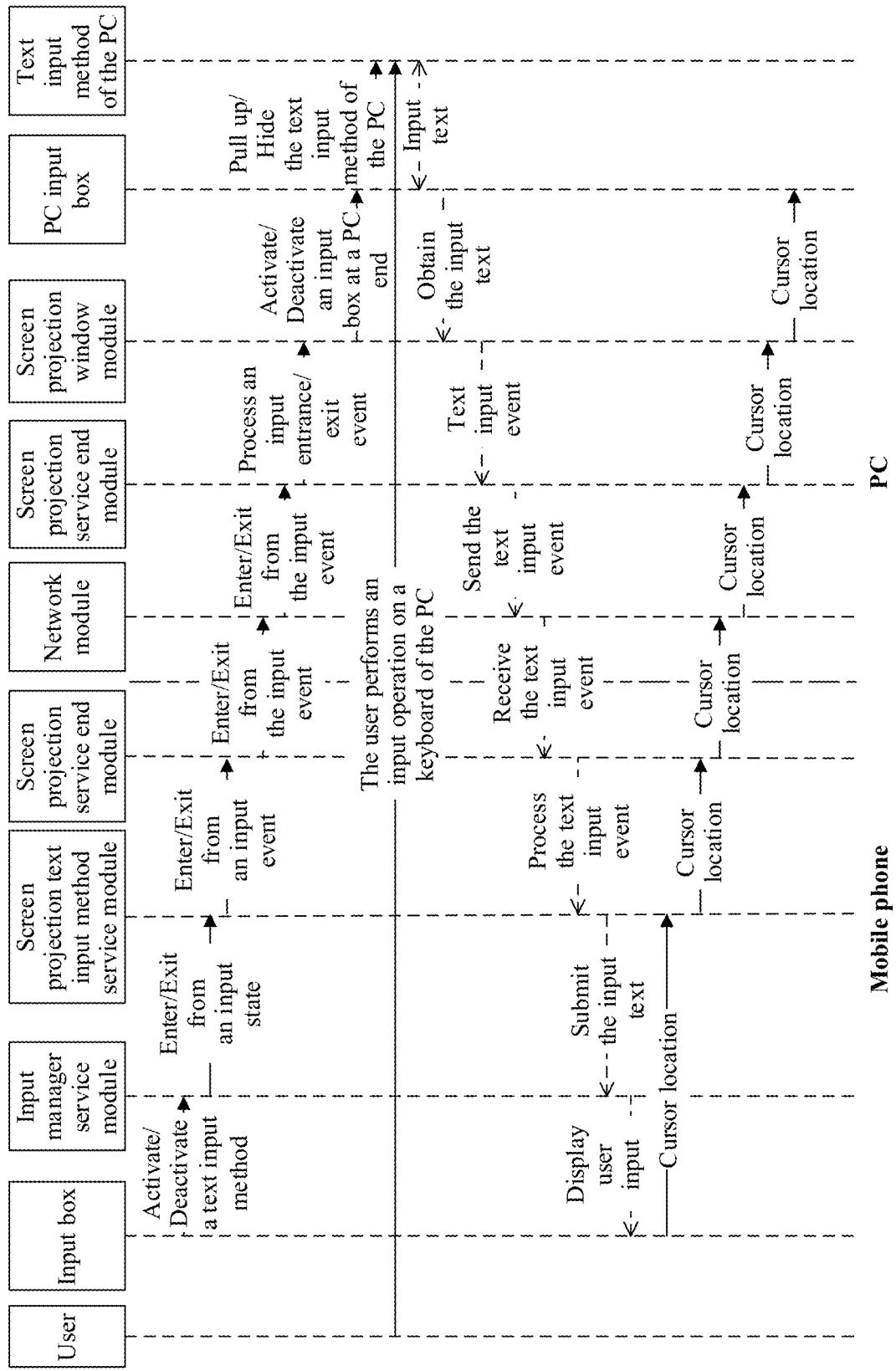
FIG. 9 is a flowchart of an input method according to an embodiment of this application.

In an embodiment, an input method is provided. Referring to FIG. 9, the method includes the following content.

When a mobile phone projects screen display content of the mobile phone onto a PC, so that the PC displays the screen display content of the mobile phone, and an input box (edittext) of the mobile phone obtains an input focus, a text input method of the mobile phone may be activated. An input manager service module (input manager service) of the mobile phone sends an input entrance event (that is, an input state entrance event) of the input box to a screen projection text input method service module. The screen projection text input method service module sends the input entrance event to a screen projection service end module. The screen projection service end module sends the input entrance event to a network module of the PC. The network module sends, to a screen projection client module, the input entrance event received by the network module. The screen projection client module processes the input entrance event and sends the input entrance event to a screen projection window module, so that the screen projection window module activates a PC input box, thereby pulling up a text input method of the PC. In this way, a user can perform an input operation on a PC end by using a keyboard of the PC.

The user may enter text to the PC input box by using the text input method of the PC. The screen projection window module obtains the input text in the PC input box. The screen projection window module sends a text input event to the screen projection service end module by using the screen projection client module and the network module in sequence, and the text input event includes the input text. The screen projection service end module processes the text input event, to obtain the input text in the text input event, submits the input text to a text input method manager service module, and submits the input text to the input box of the mobile phone, so that the input operation performed by the user on the PC end is displayed in the box of the mobile phone.

The input box of the mobile phone sends a change in a cursor location to the screen projection text input method service module, and the screen projection text input method service module sends the cursor location to the screen projection service end module. The screen projection service end module sends the cursor location to the network module. The network module sends the cursor location to the screen projection client module. The screen projection client module sends the cursor location to the screen projection window module. The screen projection window module sends the cursor location to the PC input box, so that the PC input box can adjust a location of the PC input box based on the cursor location of the input box of the mobile phone.

When the input box of the mobile phone loses the input focus, the text input method of the mobile phone may be deactivated. The input manager service module (input manager service) of the mobile phone sends an input exit event (namely, an input state exit event) of the input box to the screen projection text input method service module. The screen projection text input method service module sends the input exit event to the screen projection service end module. The screen projection service end module sends the input exit event to the network module of the PC. The network module sends, to the screen projection client module, the input exit event received by the network module. The screen projection client module processes the input exit event and sends the input exit event to the screen projection window module, so that the screen projection window module deactivates the PC input box, thereby hiding the text input method of the PC.

Figure 10:
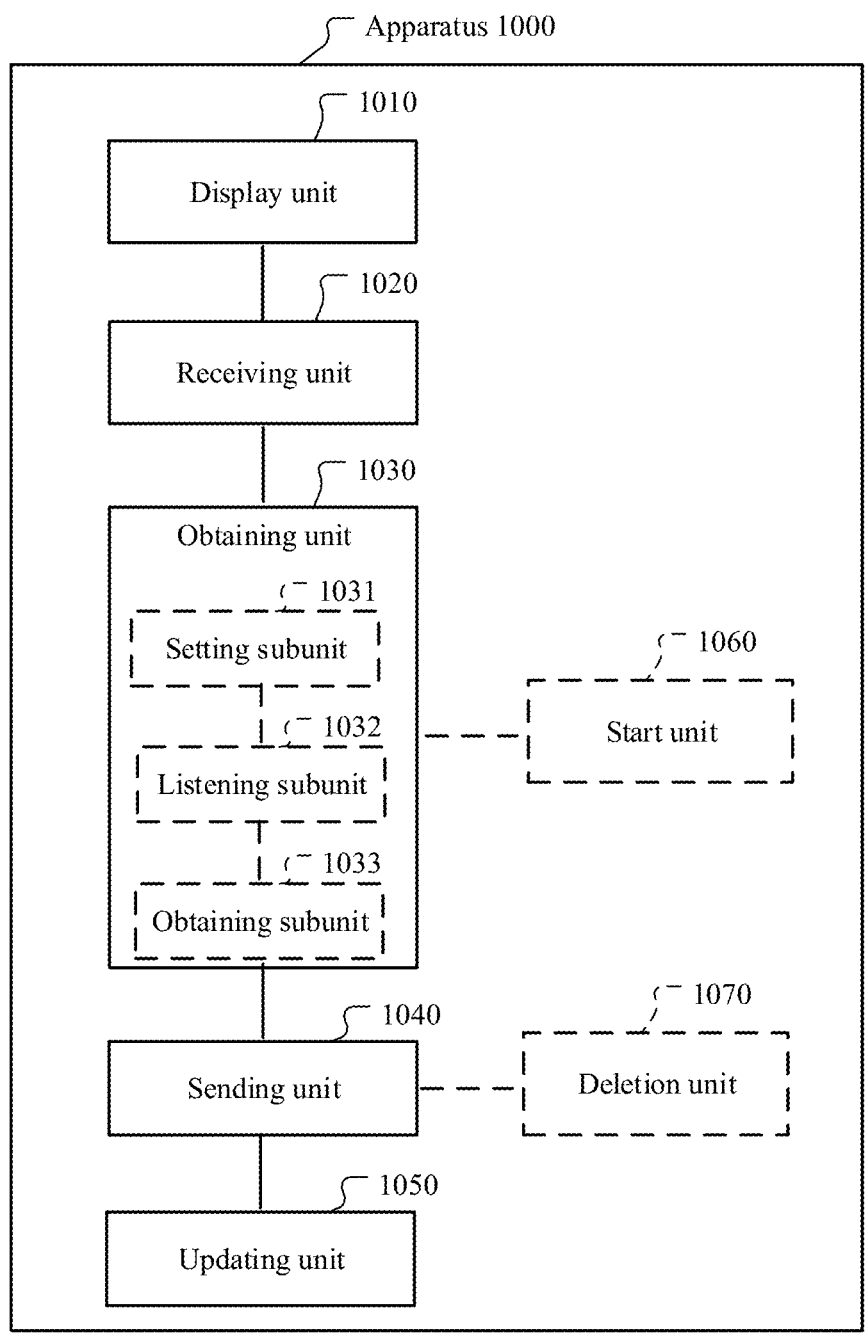
FIG. 10 is a schematic block diagram of an apparatus according to an embodiment of this application.

An embodiment of this application provides an apparatus 1000. Referring to FIG. 10, the apparatus 1000 includes:
a display unit 1010, configured to display a screen projection window in at least a part of a display interface, where the screen projection window is a mirror of screen display content of a screen projection source end, and the screen display content includes a first edit box;
a receiving unit 1020, configured to receive input start information from the screen projection source end, where the input start information is used to indicate that the first edit box has obtained an input focus;
an obtaining unit 1030, configured to obtain, in response to the input start information, text content or an image that is input by an input device of the apparatus, to obtain to-be-displayed content;
a sending unit 1040, configured to send the to-be-displayed content to the screen projection source end; and
an updating unit 1050, configured to update the screen projection window, where an updated screen projection window is a mirror of updated screen display content of the screen projection source end, and the to-be-displayed content is displayed in the first edit box in the updated screen display content.

In some embodiments, the obtaining unit 1030 includes a setting subunit 1031, a monitoring subunit 1032, and an obtaining subunit 1033. The setting subunit 1031 is configured to set, in response to the input start information, a second edit box of the screen projection destination end to an input state. The monitoring subunit 1032 is configured to monitor a content change event of the second edit box. The obtaining subunit 1033 is configured to obtain, in response to the content change event, text content or an image that triggers the content change event, where the obtained text content or image is used as the to-be-displayed content.

In some embodiments, the apparatus further includes a start unit 1060, configured to start a first text input method in response to the input start information.

In some embodiments, the apparatus further includes a deletion unit 1070, configured to delete the text content or image from the second edit box after the sending unit sends the to-be-displayed content to the screen projection source end.

For functions of the function units of the apparatus 1000, refer to implementations of the method embodiment shown in FIG. 2. Details are not described herein again.

According to the apparatus provided in this embodiment of this application, after the screen projection source end projects the screen display content of the screen projection source end onto a screen projection destination end, a user may operate and control an input device of the screen projection destination end, to generate the text content or image on the screen projection destination end; and the text content or image generated by the screen projection destination end is used as the to-be-displayed content and sent to the screen projection source end. After receiving the text content or image sent by the screen projection destination end, the screen projection source end submits the to-be-displayed content to the edit box of the screen projection source end for display, so that local input of the screen projection destination end can be synchronized to the screen projection source end without any change, thereby improving input experience of the user.

Figure 11:
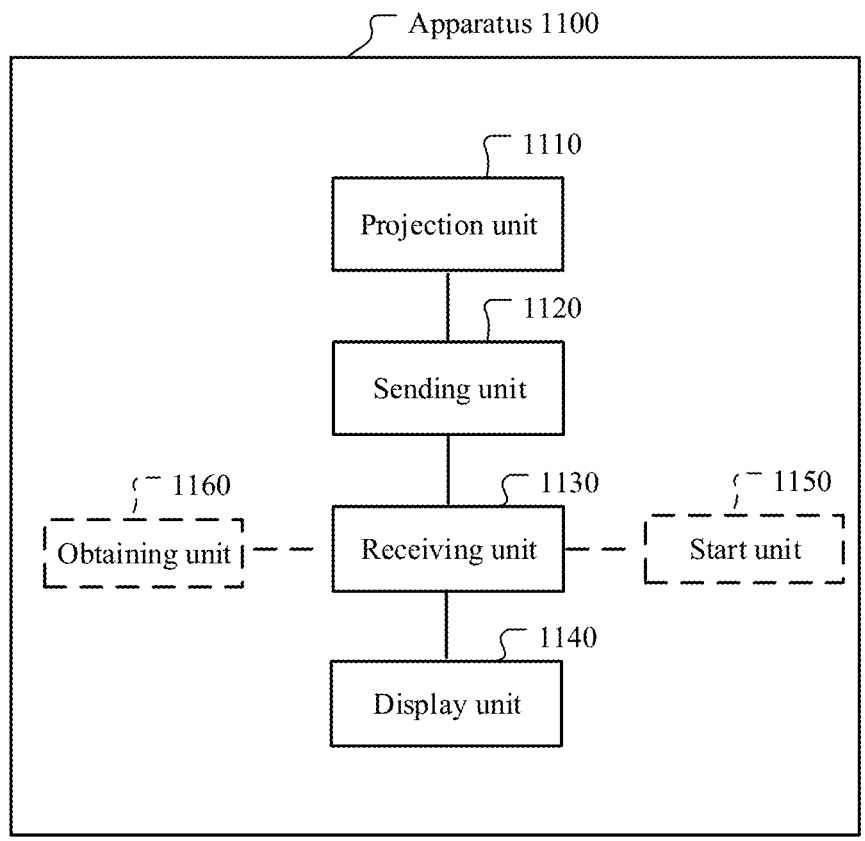
FIG. 11 is a schematic block diagram of an apparatus according to an embodiment of this application.

An embodiment of this application provides an apparatus 1100. Referring to FIG. 11, the apparatus 1100 includes:
a projection unit 1110, configured to project screen display content of the apparatus onto a screen projection destination end, so that the screen projection destination end displays a screen projection window in at least a part of a display interface, where the screen projection window is a mirror of the screen display content, and the screen display content includes a first edit box;
a sending unit 1120, configured to send input start information to the screen projection destination end, where the input start information is used to indicate that the first edit box has obtained an input focus;
a receiving unit 1130, configured to receive to-be-displayed content from the screen projection destination end, where the to-be-displayed content is obtained by the screen projection destination end in response to the input start information, and the to-be-displayed content is text content or an image that is input by an input device of the screen projection destination end; and
a display unit 1140, configured to display the to-be-displayed content in the first edit box, to update the screen display content.

In some embodiments, the apparatus 1100 further includes a start unit 1150. The receiving unit 1130 is further configured to receive a click/tap signal for a mirror of the first edit box from the screen projection destination end before the sending unit 1120 sends the input start information to the screen projection destination end, where the click/tap signal includes a click/tap type and a click/tap location. The start unit 1150 is configured to start a second text input method of a screen projection source end based on the click/tap signal, to monitor to a cursor location of the first edit box by using the second text input method.

In some embodiments, the apparatus 1100 further includes an obtaining unit 1160. The receiving unit 1130 is further configured to obtain the click/tap signal for the mirror of the first edit box from the screen projection destination end before the sending unit 1120 sends the input start information to the screen projection destination end, where the click/tap signal includes the click/tap type and the click/tap location. The obtaining unit 1160 is configured to enable, based on the click/tap signal, the first edit box to obtain the input focus. The sending unit 1120 is configured to send the input start information to the screen projection destination end.

For functions of the function units of the apparatus 1100, refer to implementations of the method embodiment shown in FIG. 6. Details are not described herein again.

According to the apparatus provided in this embodiment of this application, after a screen projection source end projects screen display content of the screen projection source end onto the screen projection destination end, a user may operate and control the input device of the screen projection destination end, to generate the text content or image on the screen projection destination end; and the text content or image generated by the screen projection destination end is used as the to-be-displayed content and sent to the screen projection source end. After receiving the text content or image sent by the screen projection destination end, the screen projection source end submits the to-be-displayed content to the edit box of the screen projection source end for display, so that local input of the screen projection destination end can be synchronized to the screen projection source end without any change, thereby improving input experience of the user.

The foregoing mainly describes the apparatuses provided in the embodiments of this application from a perspective of a method process. It can be understood that, to implement the foregoing functions, each electronic device includes a corresponding hardware structure and/or software module for implementing each function. A person skilled in the art should easily be aware that, in combination with units and algorithm steps of the examples described in the embodiments disclosed in this specification, this application can be implemented by using hardware or a combination of hardware and computer software. Whether a function is performed by using hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of an electronic device may be divided according to the method embodiment shown in FIG. 2 or the method embodiment shown in FIG. 6. For example, the function modules may be divided based on functions, or two or more functions may be integrated into one processing module. The integrated module may be implemented in a form of hardware, or may be implemented in a form of a software functional module. It should be noted that, in the embodiments of this application, division into the modules is an example, and is merely a logical function division. In actual implementation, another division manner may be used.

Figure 12:
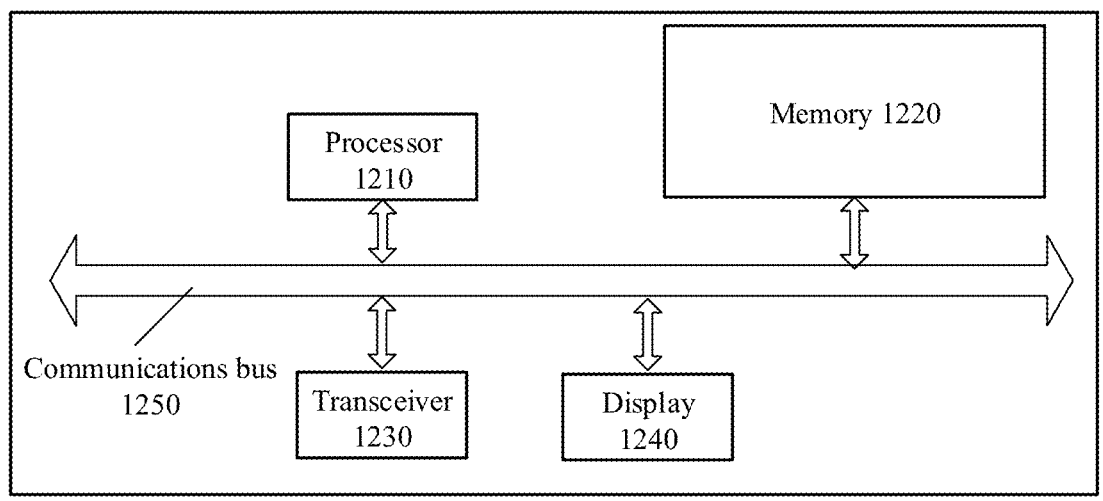
FIG. 12 is a schematic block diagram of a screen projection destination end according to an embodiment of this application.

An embodiment of this application provides a screen projection destination end. Referring to FIG. 12, the screen projection destination end includes a processor 1210, a memory 1220, a transceiver 1230, and a display 1240. The memory is configured to store computer executable instructions. When the screen projection destination end runs, the processor 1210 executes the computer executable instructions stored in the memory 1220, to enable the screen projection destination end to perform the method shown in FIG. 2. The display 1240 is configured to display a screen projection window in at least a part of a display interface, where the screen projection window is a mirror of screen display content of a screen projection source end, and the screen display content includes a first edit box. The transceiver 1230 is configured to receive input start information from the screen projection source end, where the input start information is used to indicate that the first edit box has obtained an input focus. The processor 1210 is configured to obtain, in response to the input start information, text content or an image that is input by an input device of the apparatus, to obtain to-be-displayed content. The transceiver 1230 is configured to send the to-be-displayed content to the screen projection source end. The display 1240 is configured to update the screen projection window, where an updated screen projection window is a mirror of updated screen display content of the screen projection source end, and the to-be-displayed content is displayed in the first edit box in the updated screen display content.

In some embodiments, the screen projection destination end further includes a communications bus 1250. The processor 1210 may be connected to the memory 1220, the transceiver 1230, and the display 1240 by using the communications bus 1250, thereby implementing corresponding control over the transceiver 1230 and the display 1240 based on the computer executable instructions stored in the memory 1220.

For a specific implementation of each part/component of the screen projection destination end in this embodiment of this application, refer to each implementation of the method embodiment shown in FIG. 2. Details are not described herein again.

Therefore, after the screen projection source end projects the screen display content of the screen projection source end onto the screen projection destination end, a user may operate and control the input device of the screen projection destination end, to generate the text content or image on the screen projection destination end; and the text content or image generated by the screen projection destination end is used as the to-be-displayed content and sent to the screen projection source end. After receiving the text content or image sent by the screen projection destination end, the screen projection source end submits the to-be-displayed content to the edit box of the screen projection source end for display, so that local input of the screen projection destination end can be synchronized to the screen projection source end without any change, thereby improving input experience of the user.

Figure 13:
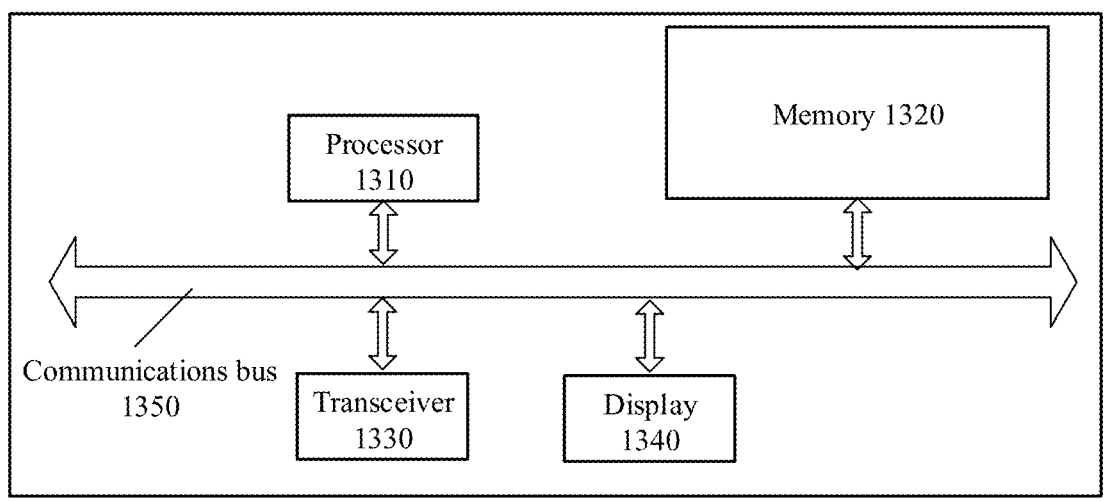
FIG. 13 is a schematic block diagram of a screen projection source end according to an embodiment of this application.

An embodiment of this application provides a screen projection source end. Referring to FIG. 13, the screen projection source end includes a processor 1310, a memory 1320, a transceiver 1330, and a display 1340. The memory is configured to store computer executable instructions. When the screen projection source end runs, the processor 1310 executes the computer executable instructions stored in the memory 1320, to enable the screen projection source end to perform the method shown in FIG. 6. The transceiver 1330 is configured to project screen display content of the display 1340 onto a screen projection destination end, so that the screen projection destination end displays a screen projection window in at least a part of a display interface, where the screen projection window is a mirror of the screen display content, and the screen display content includes a first edit box. The transceiver 1330 is configured to send input start information to the screen projection destination end, where the input start information is used to indicate that the first edit box has obtained an input focus. The transceiver 1330 is configured to receive to-be-displayed content from the screen projection destination end, where the to-be-displayed content is obtained by the screen projection destination end in response to the input start information, and the to-be-displayed content is text content or an image that is input by an input device of the screen projection destination end. The display 1340 is configured to display the to-be-displayed content in the first edit box, to update the screen display content.

In some embodiments, the screen projection source end further includes a communications bus 1350. The processor 1310 may be connected to the memory 1320, the transceiver 1330, and the display 1340 by using the communications bus 1350, thereby implementing corresponding control over the transceiver 1330 and the display 1340 based on the computer executable instructions stored in the memory 1320.

For a specific implementation of each part/component of the screen projection source end in this embodiment of this application, refer to each implementation of the method embodiment shown in FIG. 6. Details are not described herein again.

Therefore, after the screen projection source end projects the screen display content of the screen projection source end onto the screen projection destination end, a user may operate and control the input device of the screen projection destination end, to generate the text content or image on the screen projection destination end; and the text content or image generated by the screen projection destination end is used as the to-be-displayed content and sent to the screen projection source end. After receiving the text content or image sent by the screen projection destination end, the screen projection source end submits the to-be-displayed content to the edit box of the screen projection source end for display, so that local input of the screen projection destination end can be synchronized to the screen projection source end without any change, thereby improving input experience of the user.

It may be understood that, the processor in the embodiments of this application may be a central processing unit (CPU), or may be another general-purpose processor, a digital signal processor (DSP), an application-specific integrated circuit (ASIC), a field programmable gate array (FPGA), or another programmable logical device, a transistor logical device, a hardware component, or any combination thereof. The general-purpose processor may be a microprocessor or any regular processor or the like.

Method steps in the embodiments of this application may be implemented in a hardware manner, or may be implemented in a manner of a processor executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium or write information into the storage medium. It is clear that, the storage medium may alternatively be a component of the processor. The processor and the storage medium may be located in the ASIC.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It can be understood that various reference numerals involved in the embodiments of this application are merely intended for distinguishing for ease of description, but are not intended to limit the scope of the embodiments of this application.

What is claimed is:

1. An input method, comprising:
    displaying, by a screen projection destination end, a screen projection window in at least a part of a display interface, wherein the screen projection window is a mirror of screen display content of a screen projection source end, and the screen display content comprises a first edit box;
    receiving, by the screen projection destination end, input start information from the screen projection source end, wherein the input start information is used to indicate that the first edit box has obtained an input focus;
    obtaining, by the screen projection destination end in response to the input start information, text content or an image that is input by an input device of the screen projection destination end, to obtain to-be-displayed content;
    sending, by the screen projection destination end, the to-be-displayed content to the screen projection source end;
    updating, by the screen projection destination end, the screen projection window, wherein an updated screen projection window is a mirror of updated screen display content of the screen projection source end, and the to-be-displayed content is displayed in the first edit box in the updated screen display content; and
    before receiving, by the screen projection destination end, the input start information from the screen projection source end, sending, by the screen projection destination end, a first tap signal to the screen projection source end by using a reverse control channel, wherein the first tap signal is used to enable the screen projection source end to acquire the input start information.

2. The method according to claim 1, wherein obtaining, by the screen projection destination end in response to the input start information, text content or the image that is input by the input device of the screen projection destination end comprises:
   setting, by the screen projection destination end in response to the input start information, a second edit box of the screen projection destination end to an input state;
   monitoring, by the screen projection destination end, a content change event of the second edit box; and
   obtaining, by the screen projection destination end in response to the content change event, text content or an image that triggers the content change event, wherein the obtained text content or image is used as the to-be-displayed content.

3. The method according to claim 1, wherein the text content or image is generated by a first text input method of the screen projection destination end based on an operation command generated by the input device.

4. The method according to claim 3, wherein the method further comprises starting, by the screen projection destination end, the first text input method in response to the input start information.

5. The method according to claim 2, wherein the second edit box is a hidden edit box or a transparent edit box; and
   the input start information comprises a first cursor location of the first edit box, and the method further comprises:
   setting, by the screen projection destination end, a location of the second edit box in the screen projection window based on the first cursor location.

6. The method according to claim 2, wherein after sending, by the screen projection destination end, the to-be-displayed content to the screen projection source end, the method further comprises:
   deleting, by the screen projection destination end, the text content or image from the second edit box.

7. The method according to claim 1, wherein before receiving, by the screen projection destination end, the input start information from the screen projection source end, the method further comprises:
   obtaining, by the screen projection destination end, a click/tap signal for a mirror of the first edit box in the screen projection window, wherein the click/tap signal comprises a click/tap type and a click/tap location; and
   sending, by the screen projection destination end, the click/tap signal to the screen projection source end, to enable the first edit box to obtain the input focus.

8. An input method, comprising:
   projecting, by a screen projection source end, screen display content of the screen projection source end to a screen projection destination end, so that the screen projection destination end displays a screen projection window in at least a part of a display interface, wherein the screen projection window is a mirror of the screen display content, and the screen display content comprises a first edit box;
   sending, by the screen projection source end, input start information to the screen projection destination end, wherein the input start information is used to indicate that the first edit box has obtained an input focus;
   receiving, by the screen projection source end, to-be-displayed content from the screen projection destination end, wherein the to-be-displayed content is obtained by the screen projection destination end in response to the input start information, and the to-be-displayed content is text content or an image that is input by an input device of the screen projection destination end; and
   displaying, by the screen projection source end, the to-be-displayed content in the first edit box, to update the screen display content;
   before sending, by the screen projection source end, the input start information to the screen projection destination end,
   receiving, by the screen projection source end, a first tap signal sent by the screen projection destination end by using a reverse control channel, wherein the first tap signal is used to enable the screen projection source end to acquire input start information.

9. The method according to claim 8, wherein the input start information is used to set a second edit box of the screen projection destination end to an input state, and the to-be-displayed content is text content or an image of a content change event that triggers the second edit box.

10. The method according to claim 8, wherein the to-be-displayed content is generated by a first text input method of the screen projection destination end based on an operation command generated by the input device.

11. The method according to claim 9, wherein the second edit box is a hidden edit box or a transparent edit box.

12. The method according to claim 9, wherein the input start information comprises a first cursor location of the first edit box, and the first cursor location is used to set a location of the second edit box in the screen projection window.

13. The method according to claim 10, wherein before sending, by the screen projection source end, the input start information to the screen projection destination end, the method further comprises:
   receiving, by the screen projection source end, a click/tap signal for a mirror of the first edit box from the screen projection destination end, wherein the click/tap signal comprises a click/tap type and a click/tap location; and
   starting a second text input method of the screen projection source end based on the click/tap signal to monitor a cursor location of the first edit box.

14. The method according to claim 8, wherein before sending, by the screen projection source end, the input start information to the screen projection destination end, the method further comprises:
   obtaining, by the screen projection source end, the click/tap signal for the mirror of the first edit box from the screen projection destination end, wherein the click/tap signal comprises a click/tap type and a click/tap location; and
   enabling, by the screen projection source end based on the click/tap signal, the first edit box to obtain the input focus, and sending the input start information to the screen projection destination end.

15. A screen projection source end, comprising: a processor, a memory, a transceiver, and a display, wherein the memory is configured to store computer executable instructions; and when the instructions are executed by the screen projection source end, the screen projection source end performs the following operations:
   projecting screen display content of the screen projection source end to a screen projection destination end, so that the screen projection destination end displays a screen projection window in at least a part of a display interface, wherein the screen projection window is a mirror of the screen display content, and the screen display content comprises a first edit box;

sending input start information to the screen projection destination end, wherein the input start information is used to indicate that the first edit box has obtained an input focus;

receiving to-be-displayed content from the screen projection destination end, wherein the to-be-displayed content is obtained by the screen projection destination end in response to the input start information, and the to-be-displayed content is text content or an image that is input by an input device of the screen projection destination end; and displaying the to-be-displayed content in the first edit box, to update the screen display content; and before sending the input start information to the screen projection destination end, receiving a first tap signal sent by the screen projection destination end by using a reverse control channel, wherein the first tap signal is used to enable the screen projection source end to acquire input start information.

16. The screen projection source end according to claim 15, wherein the input start information is used to set a second edit box of the screen projection destination end to an input state, and the to-be-displayed content is text content or an image of a content change event that triggers the second edit box.

17. The screen projection source end according to claim 15, wherein the to-be-displayed content is generated by a first text input method of the screen projection destination end based on an operation command generated by the input device.

18. The screen projection source end according to claim 16, wherein the input start information comprises a first cursor location of the first edit box, and the first cursor location is used to set a location of the second edit box in the screen projection window.

19. The screen projection source end according to claim 15, wherein the operations further comprise:

before sending, by the screen projection source end, the input start information to the screen projection destination end, receiving, by the screen projection source end, a click/tap signal for a mirror of the first edit box from the screen projection destination end, wherein the click/tap signal comprises a click/tap type and a click/tap location; and starting a second text input method of the screen projection source end based on the click/tap signal to monitor a cursor location of the first edit box.

20. The screen projection source end according to claim 15, wherein the operations further comprise:

before sending, by the screen projection source end, the input start information to the screen projection destination end, obtaining, by the screen projection source end, a click/tap signal for the mirror of the first edit box from the screen projection destination end, wherein the click/tap signal comprises a click/tap type and a click/tap location; and enabling, by the screen projection source end based on the click/tap signal, the first edit box to obtain the input focus, and sending the input start information to the screen projection destination end.

* * * * *

UNITED STATES PATENT AND TRADEMARK OFFICE
CERTIFICATE OF CORRECTION

PATENT NO. : 12,032,866 B2
APPLICATION NO. : 17/615977
DATED : July 9, 2024
INVENTOR(S) : Ronggen Li et al.

Page 1 of 1

It is certified that error appears in the above-identified patent and that said Letters Patent is hereby corrected as shown below:

On the Title Page

In item (57), in Column 2, in "Abstract", Line 10, delete "content" and insert -- content; --.

Signed and Sealed this
Fourth Day of February, 2025

Coke Morgan Stewart
*Acting Director of the United States Patent and Trademark Office*